US011811952B2

(12) United States Patent
Lu et al.

(10) Patent No.: US 11,811,952 B2
(45) Date of Patent: Nov. 7, 2023

(54) AUTHENTICATION SYSTEM AND WORKING METHOD THEREOF

(71) Applicant: FEITIAN TECHNOLOGIES CO., LTD., Beijing (CN)

(72) Inventors: Zhou Lu, Beijing (CN); Huazhang Yu, Beijing (CN)

(73) Assignee: FEITIAN TECHNOLOGIES CO., LTD., Beijing (CN)

( * ) Notice: Subject to any disclaimer, the term of this patent is extended or adjusted under 35 U.S.C. 154(b) by 521 days.

(21) Appl. No.: 17/173,092

(22) Filed: Feb. 10, 2021

(65) Prior Publication Data
US 2021/0243040 A1 Aug. 5, 2021

Related U.S. Application Data

(63) Continuation of application No. PCT/CN2019/100669, filed on Aug. 14, 2019.

(30) Foreign Application Priority Data

Aug. 15, 2018 (CN) .......................... 201810929968.0
Aug. 15, 2018 (CN) .......................... 201810930525.3

(51) Int. Cl.
H04L 9/32 (2006.01)
G06F 16/245 (2019.01)
(Continued)

(52) U.S. Cl.
CPC .......... H04L 9/3271 (2013.01); G06F 16/245 (2019.01); H04L 9/0643 (2013.01);
(Continued)

(58) Field of Classification Search
CPC ... H04L 9/3271; H04L 9/0643; H04L 9/0861; H04L 9/3236; H04L 9/3247;
(Continued)

(56) References Cited

U.S. PATENT DOCUMENTS 8,584,224 B1 11/2013 Pei et al.
9,032,212 B1 5/2015 Juels
(Continued)

FOREIGN PATENT DOCUMENTS

CN 101005357 A 7/2007
CN 101079705 A 11/2007
(Continued)

OTHER PUBLICATIONS

International Search Report.
(Continued)

*Primary Examiner* — Philip J Chea
*Assistant Examiner* — Sangseok Park
(74) *Attorney, Agent, or Firm* — J.C. PATENTS

(57) ABSTRACT

A working method includes: a client receives and parses an authentication request to obtain an application identifier, an authentication policy and a challenge value; generates a signature key identifier list according to the authentication policy; sends an identity information verifying instruction generated according to the challenge value, the application identifier and the signature key identifier list; an authenticator obtains a signature private key and a signature key identifier according to the signature key identifier list and the application identifier; generates a final challenge hash value according to the application identifier and the challenge value; generates a signature value according to the final challenge hash value, the preset authenticator identifier and the signature key identifier; sends the signature value to a server; the server receives the signature value and verifies the signature value, determines whether the verifying is successful, if yes, the verifying is successful; otherwise, the verifying is failed.

22 Claims, 20 Drawing Sheets

(51) Int. Cl.
*H04L 9/06* (2006.01)
*H04L 9/08* (2006.01)
*H04L 9/40* (2022.01)

(52) U.S. Cl.
CPC .......... *H04L 9/0861* (2013.01); *H04L 9/3236* (2013.01); *H04L 9/3247* (2013.01); *H04L 63/06* (2013.01); *H04L 63/123* (2013.01); *H04L 63/20* (2013.01)

(58) Field of Classification Search
CPC ..... H04L 9/3213; H04L 63/06; H04L 63/123; H04L 63/20; H04L 63/0823; G06F 16/245; G06F 21/31; G06F 21/44
See application file for complete search history.

(56) References Cited

U.S. PATENT DOCUMENTS

| | | | |
|---|---|---|---|
| 9,489,522 | B1 | 11/2016 | El Defrawy |
| 2010/0313032 | A1 | 12/2010 | Oswalt |
| 2011/0150221 | A1 | 6/2011 | Kitada |
| 2015/0304847 | A1 | 10/2015 | Gong |
| 2017/0063838 | A1* | 3/2017 | Yin .................. H04L 63/0823 |
| 2020/0153638 | A1* | 5/2020 | Csik .................. H04L 9/3268 |

FOREIGN PATENT DOCUMENTS

| | | |
|---|---|---|
| CN | 101150405 A | 3/2008 |
| CN | 202696901 U | 1/2013 |
| CN | 103313242 A | 9/2013 |
| CN | 104378351 A | 2/2015 |
| CN | 104660605 A | 5/2015 |
| CN | 105162785 A | 12/2015 |
| CN | 105847247 A | 8/2016 |
| CN | 106686004 A | 5/2017 |
| CN | 108881310 A | 11/2018 |
| CN | 109150541 A | 1/2019 |

OTHER PUBLICATIONS

The first Office Action of the priority CN application 201810930525.3.
The first Office Action of the priority CN application 201810929968.0.

* cited by examiner

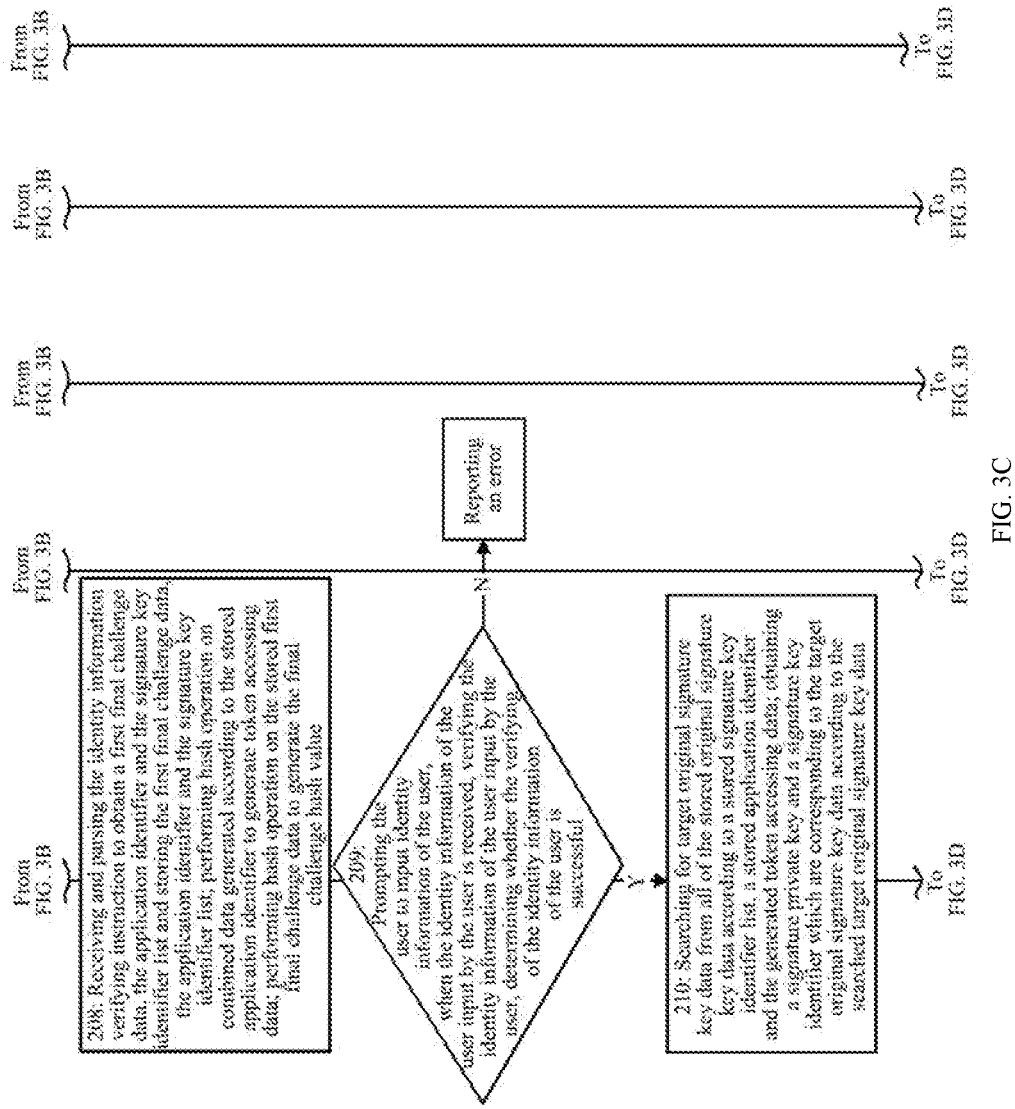

AUTHENTICATION SYSTEM AND WORKING METHOD THEREOF

CROSS-REFERENCE TO RELATED APPLICATIONS

This application is a continuation of the International Application No. PCT/CN2019/100669, filed on Aug. 14, 2019, which claims priorities of the Chinese patent application No. 201810930525.3, filed on Aug. 15, 2018 and Chinese patent application No. 201810929968.0, filed on Aug. 15, 2018, the contents of the above identified applications are incorporated herein by reference in their entireties.

TECHNICAL FIELD

The present disclosure relates to the field of communication, more particularly, to an authentication system and a working method thereof.

BACKGROUND

With wide using of network, more and more online accounts come up, and online users rely on the authentication method that uses passwords as the main authentication manner. Each user may log in to many accounts every day, for different accounts, if the password is the same, once the password leakage, multiple data will be leaked, which is extremely insecure; if the passwords are different, the passwords for different accounts will be too many and messy, forgotten passwords or confusions of passwords occur frequently, causing great inconvenience to users; and password is required whenever log in to an account, which is complicated; in addition, with the frequent occurrence of data leakage, the traditional password-based authentication methods have become increasingly unable to meet the needs of users.

At present, most commonly used authentication methods in the network are dynamic passwords and password technologies, and these authentication methods focus on strengthening passwords. Most users usually use the manner of "account name+password+short message verification code", after logging in to a mobile application, there is no need to verify the password again, there is a certain risk; there is also another way to use biometric identification technology as a substitute for entering a password, such as using voice, fingerprint, face recognition, iris, etc. This new identity authentication manner has improved the user experience to some extent, but its authentication system still adopts the traditional mode, in which biotic information is stored in a database, the user inputs biotic information at a client, the information is sent to a server to make matching comparison with the pre-stored biometric feature template so as to complete the authentication; and the human biometrics are all specific, if the server is attacked, the private information of a large number of users will be leaked, bringing security risks to users.

SUMMARY

The purpose of the disclosure is to overcome the deficiency of the prior art, the present disclosure provides an authentication system and a working method thereof.

The present disclosure provides a working method for an authenticating system, including the following steps:

Step S1, parsing, by a server, an authentication triggering request to obtain an application identifier when the server receives the authentication triggering request including a preset application identifier sent from a relying party; generating an authentication policy and a challenge value according to the authentication triggering request; generating an authentication request according to the authentication policy and the challenge value and sending the authentication request to a client via the relying party;

Step S2, receiving and parsing, by the client, the authentication request to obtain the application identifier, the authentication policy and the challenge value; generating a first final challenge data according to the application identifier and the challenge value; selecting an authenticator according to the authentication policy; generating a signature key identifier list according to the authentication policy; generating an identity information verifying instruction according to the first final challenge data, the application identifier and the signature key identifier list and sending the identity information verifying instruction to the selected authenticator;

Step S3, receiving and parsing, by the authenticator, the identity information verifying instruction to obtain the first final challenge data, the application identifier and the signature key identifier list, generating token accessing data according to the application identifier; performing calculation on the first final challenge data to generate a final challenge hash value; prompting a user to input identity information of the user, verifying the identity information of the user input by the user, when the verifying is successful, executing Step S4; otherwise, reporting an error, the procedure ends;

Step S4, obtaining, by the authenticator, a signature private key and a signature key identifier according to the signature key identifier list, the application identifier and the token accessing data; generating data to be signed according to a preset authenticator identifier, the final challenge hash value and the signature key identifier; generating a signature value by performing calculation on the data to be signed using the signature private key; generating an authentication response according to the authenticator identifier, the final challenge hash value, the signature key identifier and the signature value, and sending the authentication response to the server via the client and the relying party;

Step S5, receiving and parsing, by the server, the authentication response to obtain the authenticator identifier, the final challenge hash value, the signature key identifier and the signature value; verifying the authenticator identifier and the final challenge hash value respectively, verifying the signature value according to the signature key identifier, determining whether all results of the verifying are successful, if yes, the verification is successful, otherwise, the verification is failed.

The present disclosure further provides an authenticating system, including an authenticator, a client, a relying party and a server;

the server is configured to parse the authentication triggering request to obtain an application identifier when an authentication triggering request including a preset application identifier sent by the relying party is received; generate an authentication policy and a challenge value according to the authentication triggering request; generate an authentication request according to the application identifier, the authentication policy and the challenge value, send the authentication request to the client via the relying party;

the client is configured to receive and parse the authentication request to obtain the application identifier, the authentication policy and the challenge value; generate a first final challenge data according to the application identifier and the challenge value which are obtained by the parsing; select the authenticator according to the authentication policy; generate a signature key identifier list according to the authentication policy; generate an identity information verifying instruction according to the first final challenge data, the application identifier and the signature key identifier list and sending the identity information verifying instruction to the authenticator;

the authenticator is configured to receive and parse the identity information verifying instruction to obtain the first final challenge data, the application identifier and the signature key identifier list; generate token accessing data according to the application identifier; perform calculation on the first final challenge data to generate a final challenge hash value; prompt a user to input identity information of the user, verify the identity information of the user input by the user; report an error when authenticating is failed, the procedure ends;

the authenticator is further configured to obtain a signature private key and a signature key identifier according to the signature key identifier list, the application identifier and the token accessing data; generate data to be signed according to a preset authenticator identifier, the final challenge hash value and the signature key identifier, generate a signature value by performing calculation on the data to be signed using the signature private key; generate an authentication response according to the authenticator identifier, the final challenge hash value, the signature key identifier and the signature value and send the authentication response to the server via the client and the relying party;

the server is further configured to receive and parse the authentication response to obtain the authenticator identifier, the final challenge hash value, the signature key identifier and a signature value, verify the authenticator identifier and the final challenge hash value respectively, verify the signature value according to the signature key identifier, determine whether all results of the verifying are successful, if yes, the verification is successful, otherwise, the verification is failed.

BRIEF DESCRIPTION OF DRAWINGS

FIG. 3A to FIG. 3F is a flowchart for a working method of an authenticating system provided by Embodiment 2 of the present disclosure.

DESCRIPTION OF EMBODIMENTS

The technical solutions of the embodiments of the disclosure are described clearly and completely in conjunction with the accompanying drawings as follows. Apparently, the described drawings are merely a part of but not all of the embodiments according to the disclosure. Based on the described embodiments of the disclosure, other embodiments obtained by those of ordinary skill in the art without any creative effort would fall within the scope of the disclosure.

Embodiment 1

Figure 1A:
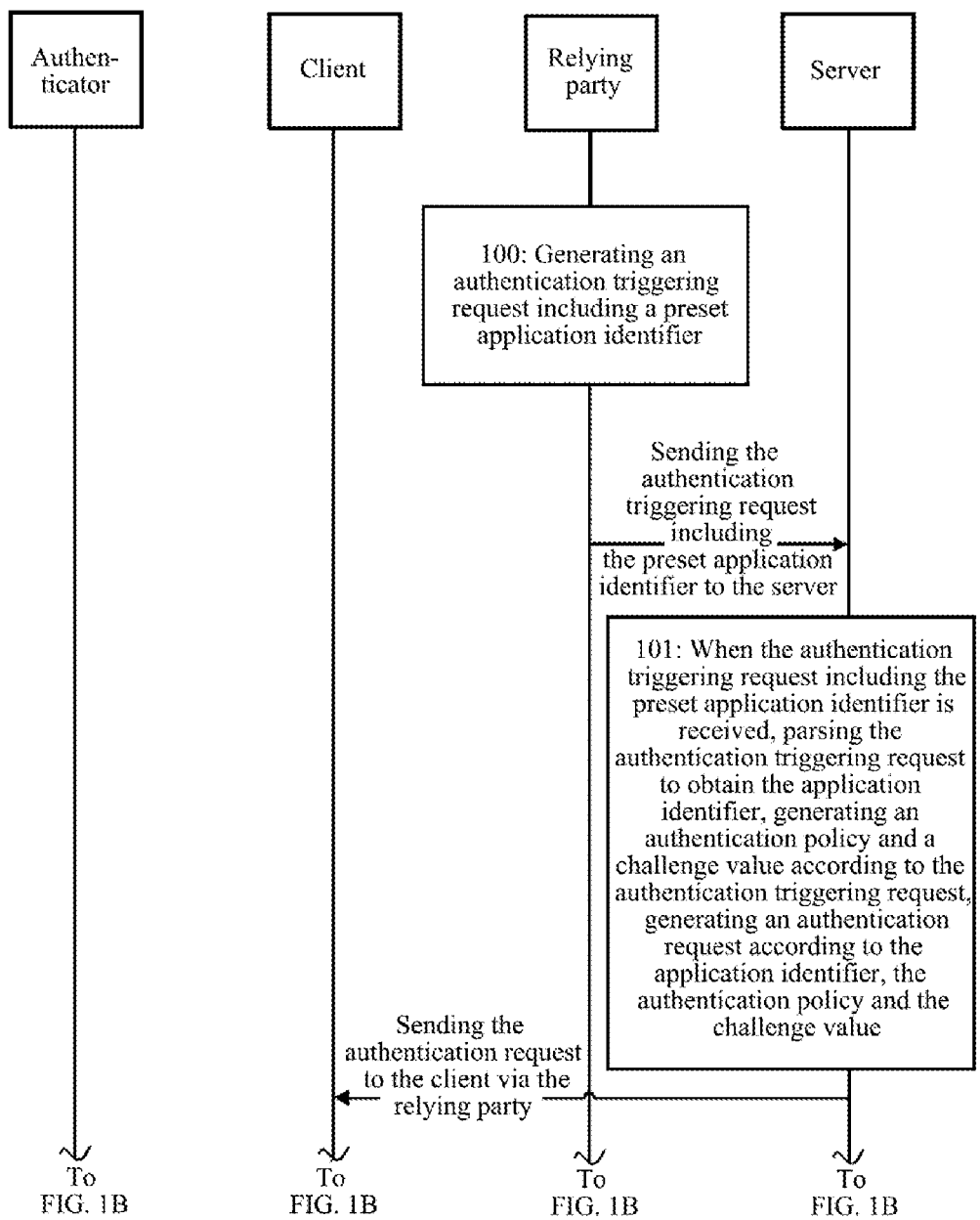
FIG. 1A to FIG. 1C is a flowchart for a working method of an authenticating system provided by Embodiment 1 of the present disclosure.
Figure 1B:
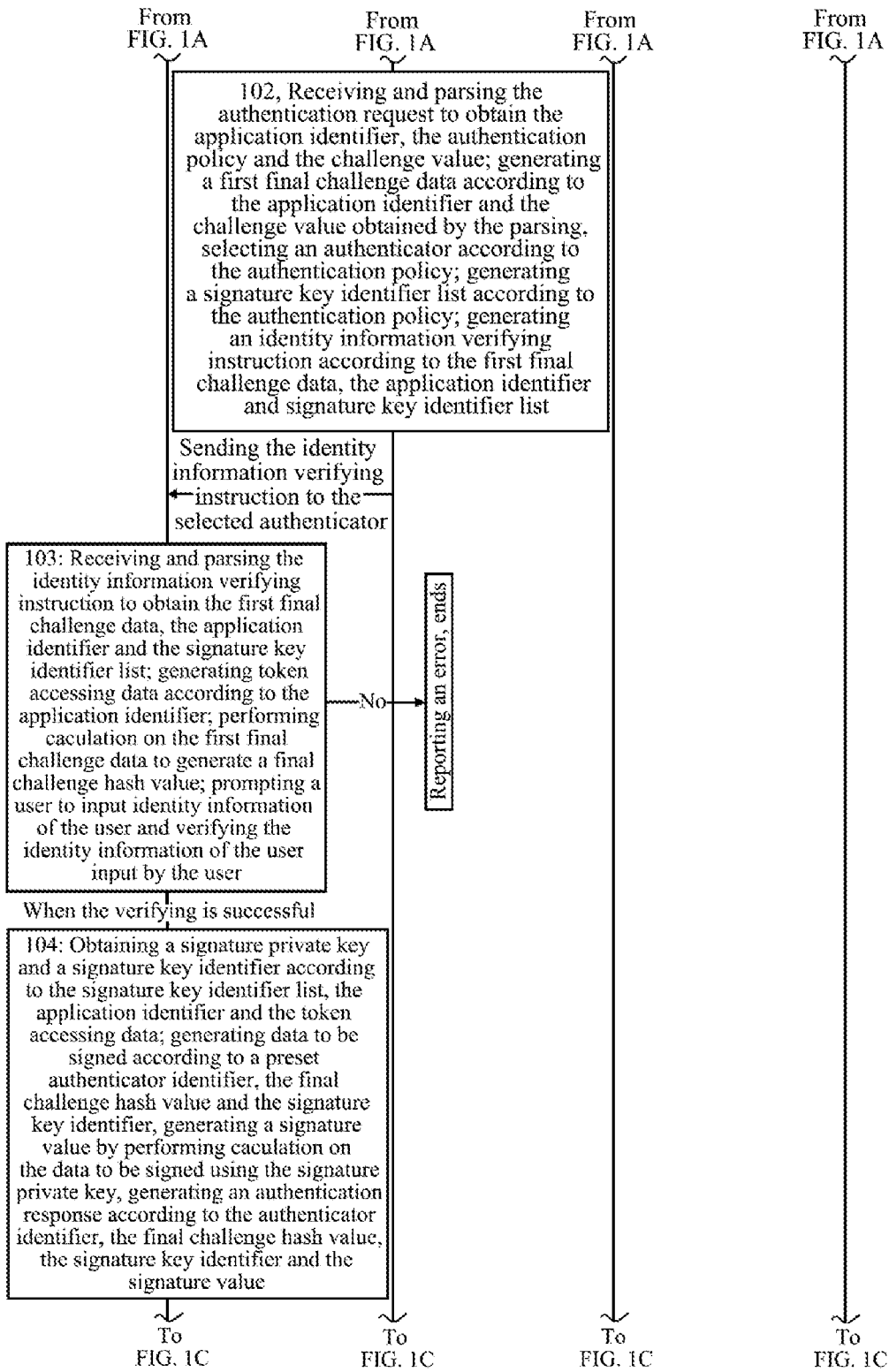
Figure 1C:
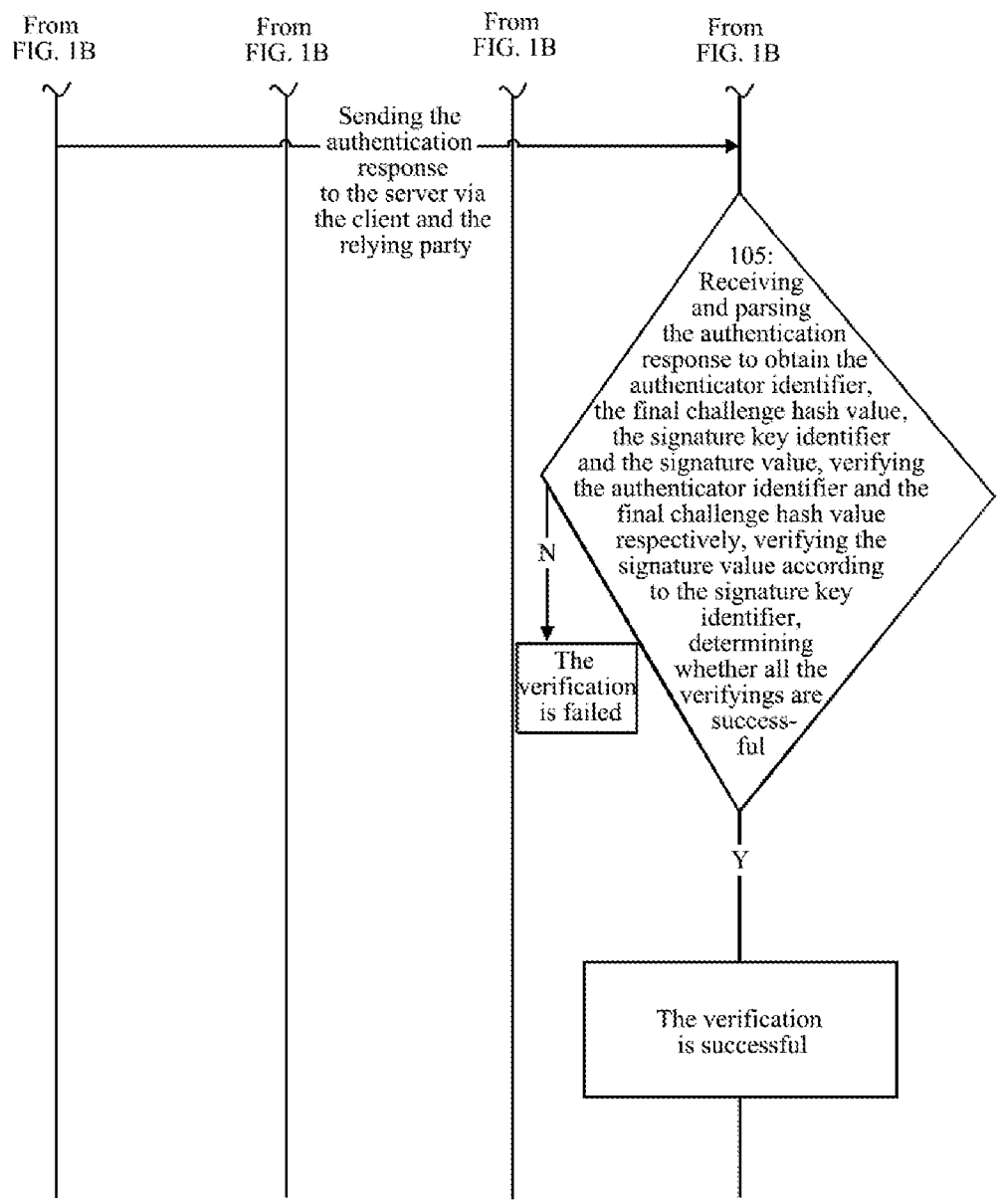

Embodiment 1 of the present disclosure provides a working method of an authenticating system. FIG. 1A to FIG. 1C is a flowchart of the working method of the authenticating system provided by Embodiment 1. As shown by FIG. 1A to FIG. 1C, the method includes the following steps:

Step 100, a relying party generates an authentication triggering request including a preset application identifier, and sends the authentication triggering request including the preset application identifier to a server;

Step 101, when the server receives the authentication triggering request including the preset application identifier, the server parses the authentication triggering request to obtain an application identifier, generates an authentication policy and a challenge value, generates an authentication request according to the application identifier, the authentication policy and the challenge value, sends the authentication request to the client via the relying party;

Step 102, the client receives and parses the authentication request to obtain the application identifier, the authentication policy and the challenge value; generates a first final challenge data according to the application identifier and the challenge value which are obtained by parsing, selects an authenticator according to the authentication policy; generates a signature key identifier list according to the authentication policy, generates an identity information verifying instruction according to the first final challenge data, the application identifier and the signature key identifier list and sends the identity information verifying instruction to the selected authenticator.

Optionally, in the present embodiment, in Step 102, after the client receives and parses the authentication request to obtain the application identifier, the authentication policy and the challenge value, the method further includes that the client determines whether a current user proxy identifier is legitimate, if yes, the client generates the first final challenge data according to the application identifier and the challenge value which are obtained by parsing, otherwise, report an error.

Further, in the present embodiment, in Step 102, the client determines whether the current user proxy identifier is legitimate according to the application identifier obtained by parsing includes the following steps:

Step D1, the client generates a request for a user proxy identifier list according to the application identifier; sends the request for a user proxy identifier list to the relying party;

Step D2, the relying party receives the request for a user proxy identifier list, obtains the user proxy identifier list and sends the obtained user proxy identifier list to the client;

Step D3, the client receives the user proxy identifier list and determines whether the current user proxy identifier exists in the user proxy identifier list.

Optionally, in the present embodiment, in Step 102, the generating a signature key identifier list according to the authentication policy is specifically that the client extracts a signature key identifier which meets a preset condition from the authentication policy and generates the signature key identifier list according to the extracted signature key identifier.

Step 103, the authenticator receives and parses the identity information verifying instruction to obtain the first final challenge data, the application identifier and the signature key identifier list; generates token accessing data according to the application identifier; performs calculation on the first final challenge data to generate a final challenge hash value; prompts a user to input identity information of the user and verifies the identity information of the user, when the verifying is successful, executes Step 104, otherwise, reports an error, the procedure ends;

Optionally, in the present embodiment, in Step 103, after generating the token accessing data, the method further includes: the authenticator updates the token accessing data according to the application identifier;

Step 104, the authenticator obtains a signature private key and a signature key identifier according to the signature key identifier list, the application identifier and the token accessing data; generates data to be signed according to a preset authenticator identifier, the final challenge hash value and the signature key identifier, generates a signature value by performing calculation on the data to be signed using the signature private key, generates an authentication response according to the authenticator identifier, the final challenge hash value, the signature key identifier and the signature value and sends the authentication response to the server via the client and the relying party;

Optionally, in the present embodiment, the authenticator obtains a signature private key and a signature key identifier according to the signature key identifier list is specifically that the authenticator searches target original signature key data from preset original signature key data according to the signature key identifier list, the application identifier and the updated token accessing data, obtains the signature private key and the signature key identifier which correspond to the target original signing data according to the target original signature key data.

Further, in the present embodiment, the authenticator searches the target original signature key data from the preset original signature key data according to the signature key identifier list, the application identifier and the updated token accessing data includes the following steps:

Step A1, the authenticator searches original signature key encrypting data according to the signature key identifier list and the application identifier;

Step A2, the authenticator decrypts the original signature key encrypted data according to a preset wrapper key to obtain the original signature key data list;

Step A3, the authenticator screens the original signature key data list according to the updated token accessing data, determines the number of the original signature key data remained in the original signature key data list after the screening, records the original signature key data remained in the original signature key data list as the target original signature key data when the number of the original signature key data remained in the original signature key data list after the screening is 1.

Optionally, in the present embodiment, in Step 104, the method further includes that the authenticator updates a preset first counting value; the generating the authentication response according to the authenticator identifier, the final challenge hash value, the signature key identifier and the signature value is specifically that the authenticator generates the authentication response according to the updated first counting value, the authenticator identifier, the final challenge hash value, the signature key identifier and the signature value;

Correspondingly, in Step 105, after the server receives and parses the authentication response and before the server determines whether all results of the verifying are successful, the method further includes that the server verifies the first counting value obtained by parsing the authentication response;

Correspondingly, in Step 105, when all results of the verifying are successful, the method further includes that the server updates a preset second counting value with the first counting value obtained by parsing the authentication response.

Further, in the present embodiment, the server verifies the first counting value obtained by parsing the authentication response is specifically that the server determines whether the first counting value obtained by parsing the authentication response is greater than the preset second counting value, if yes, the verifying is successful; otherwise, the verifying is failed.

Optionally, in the present embodiment, in Step 104, the generating the authentication response according to the authenticator, the final challenge hash value, the signature key identifier and the signature value is specifically that the authenticator generates the authentication response according to the first final challenge data, the authenticator identifier, the final challenge hash value, the signature key identifier and the signature value;

In Step 105, after the server receives and parses the authentication response and before determines whether all results of the verifying are successful, the method further includes that the server verifies the first final challenge data obtained by the parsing;

Optionally, in the present embodiment, in Step 104, the sending the authentication response via the client and the relying end includes the following steps:

Step C1, the authenticator sends the authentication response to the client;

Step C2, the client receives the authentication response and attaches the generated first final challenge data in the authentication response to update the authentication response and sends the authentication response to the relying party;

Step C3, the relying party receives the authentication response and sends the authentication response to the server;

Correspondingly, in Step 105, after the server receives and parses the authentication response and before determines whether all results of the verifying are successful, the method further includes that the server verifies the first final challenge data obtained by parsing the authentication response;

Further, in the present embodiment, the server verifies the first final challenge data obtained by parsing the authentication response is specifically that the sever determines whether the application identifier in the first final challenge data obtained by parsing the authentication response is identical to the application identifier obtained by parsing the authentication triggering request; determines whether the challenge value in the first final challenge data is identical to the generated challenge value; when the application identifier in the first final challenge data obtained by parsing the authentication response is identical to the application identifier obtained by parsing the authentication triggering request and the challenge value in the first final challenge data is identical to the generated challenge value, the verifying is successful; otherwise, the verifying is failed.

Step 105, the server receives and parses the authentication response to obtain the authenticator identifier, the final challenge hash value, the signature key identifier and the signature value, verifies the authenticator identifier and the final challenge hash value respectively, verifies the signature value according to the signature key identifier, determines whether all results of the verifying are successful, if yes, the verification is successful, otherwise the verification is failed.

Optionally, in the present embodiment, all data transmission between the relying party and the client is performed via a preset secure channel.

Further, in the present embodiment, in Step 102, the generating the first final challenge data according to the application identifier and the challenge value obtained by parsing is specifically that the client generates the first final challenge data according to a preset security channel data, the application identifier and the challenge value;

Correspondingly, in Step 105, before the verifying the final challenge hash value, the method further includes the server receives the preset security channel data sent by the relying party;

Correspondingly, in Step 105, the verifying the final challenge hash value is specifically that the server generates a second final challenge data according to the security channel data, the application identifier obtained by parsing the authenticating trigger request and the generated challenge value, performs hash operation on the second final challenge data to generate a hash operation result, determines whether the generated hash operation result is identical to the final challenge hash value obtained by parsing the authentication response, if yes, the verifying for the final challenge hash value is successful, otherwise, the verifying for the final challenge hash value is failed.

Optionally, in the present embodiment, in Step 105, the verifying the authenticator identifier obtained by parsing the authentication response includes the server determines whether the authenticator identifier obtained by parsing the authentication response meets the generated authentication policy, if yes, the verifying for the authenticator identifier is successful; otherwise, the verifying for the authenticator identifier is failed.

Optionally, in the present embodiment, in Step 105, the verifying the final challenge hash value obtained by parsing the authentication response includes the server generates a final challenge comparing data according to the application identifier obtained by parsing the authentication triggering request and the generated challenge value, performs hash operation on the final challenge comparing data to obtain the final challenge comparing hash value, determines whether the final challenge hash value obtained by parsing the authentication response is identical to the final challenge comparing value, if yes, the verifying for the final challenge hash value is successful, otherwise, the verifying for the final challenge hash value is failed.

Optionally, in the present embodiment, in Step 105, verifying the signature value according to the signature key identifier includes the server searches a signature public key according to the authenticator identifier and a signature key identifier which are obtained according to the authentication response, verifies the signature value using the searched signature public key.

In the present embodiment, the user proxy is integrated in the client; the operation performed by the user proxy belongs to the operation of the client.

Figure 2A:
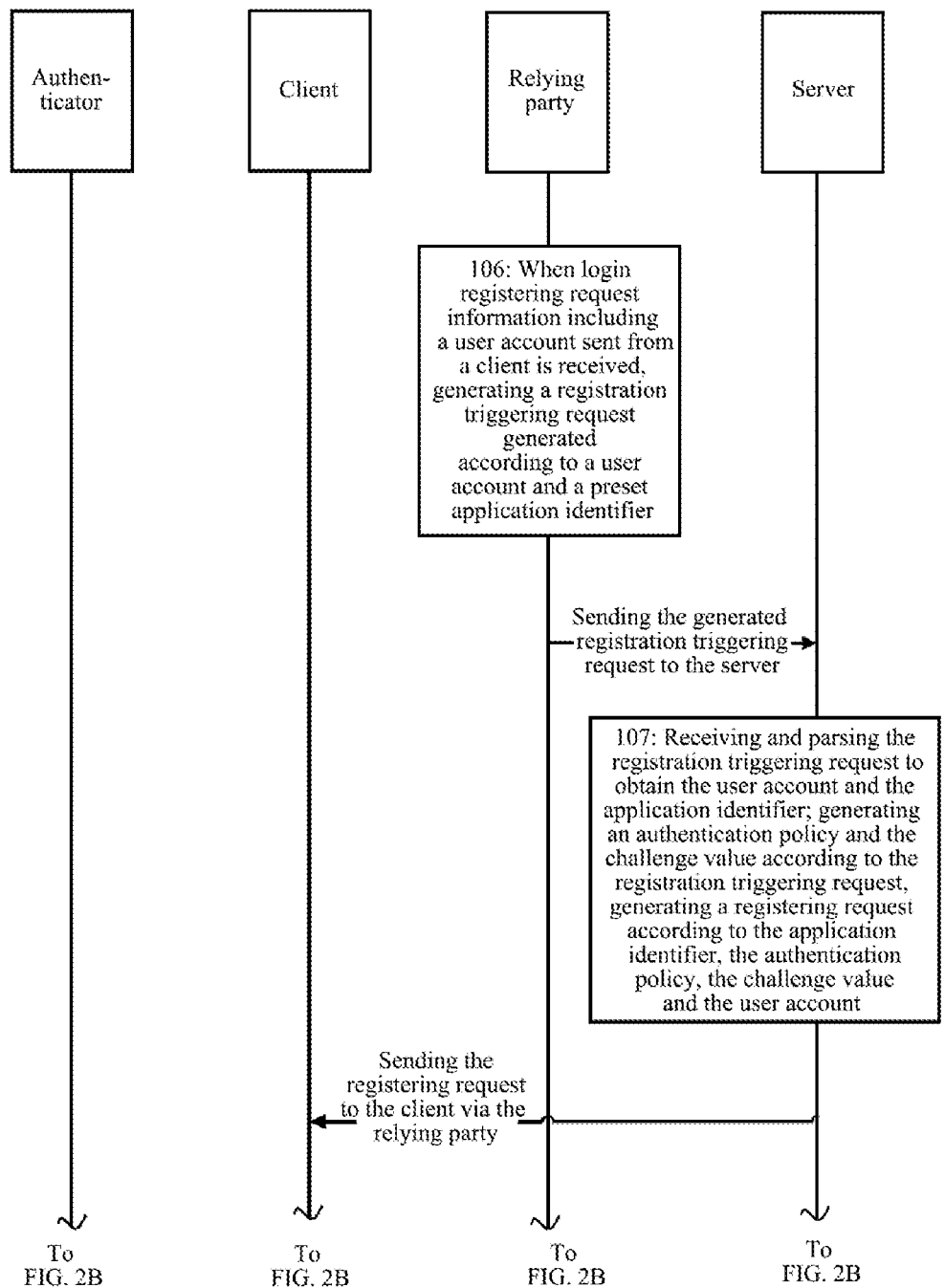
FIG. 2A to FIG. 2C is a flowchart for a working method of a registering system provided by Embodiment 1 of the present disclosure.
Figure 2B:
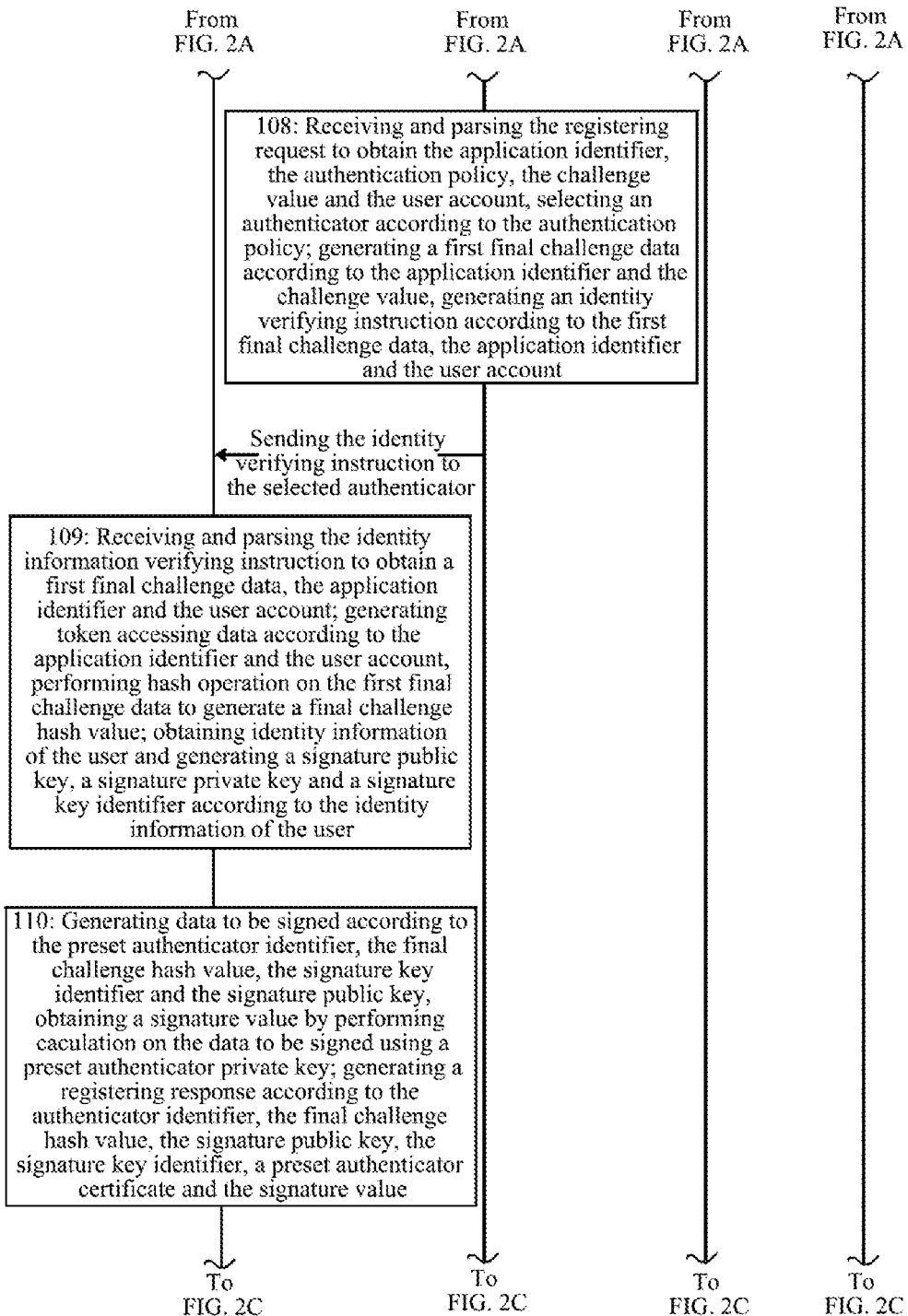
Figure 2C:
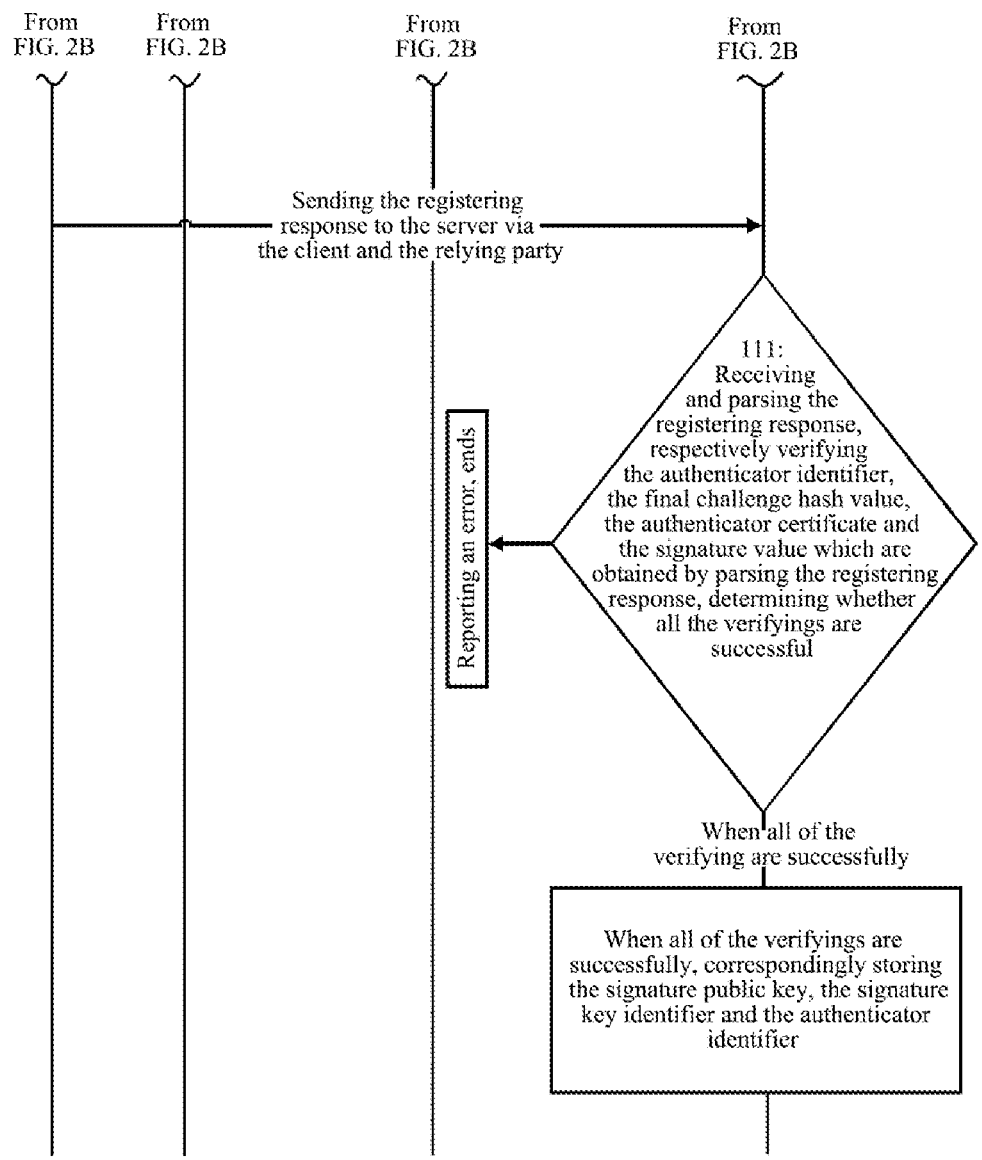
Figure 3A:
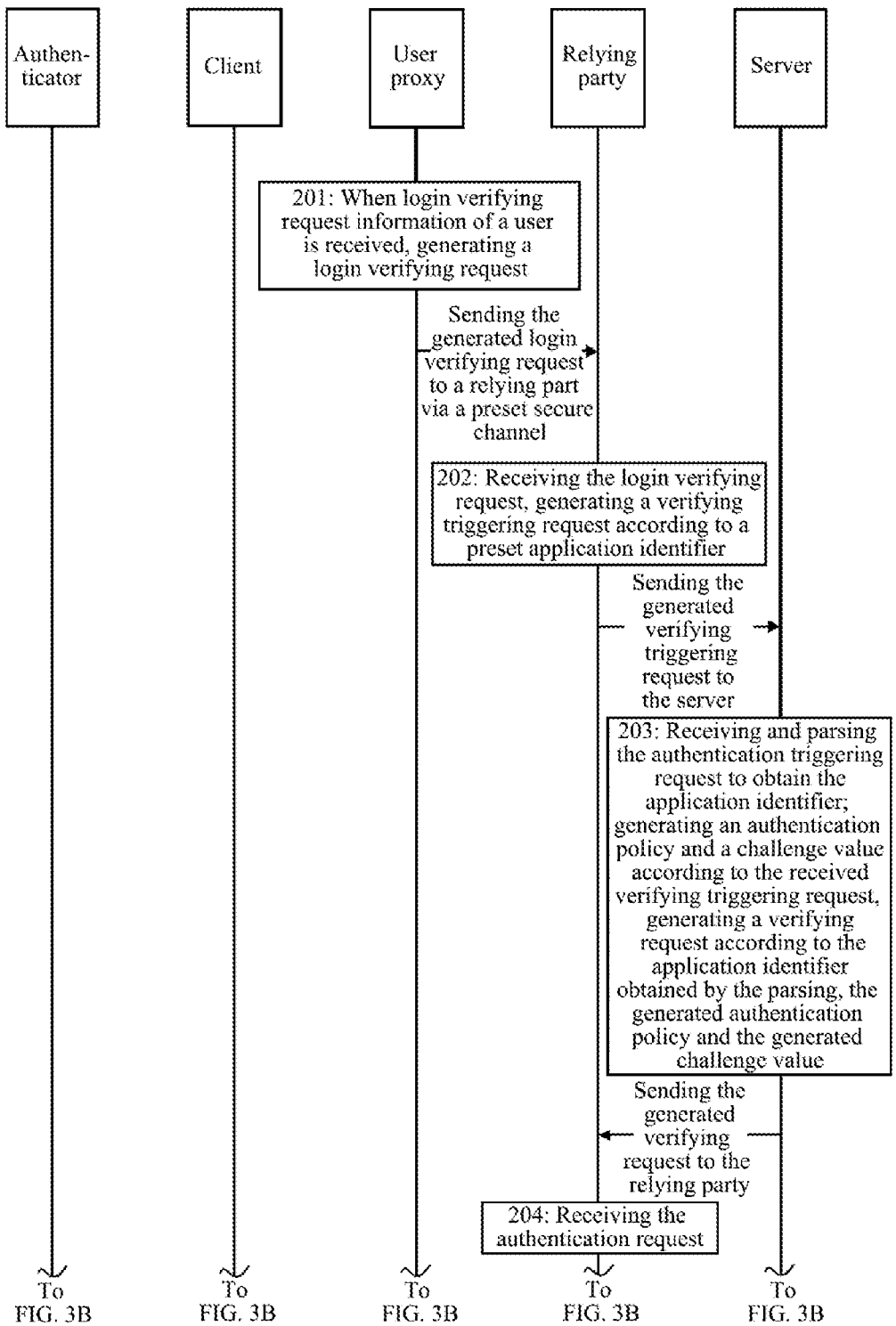
Figure 3B:
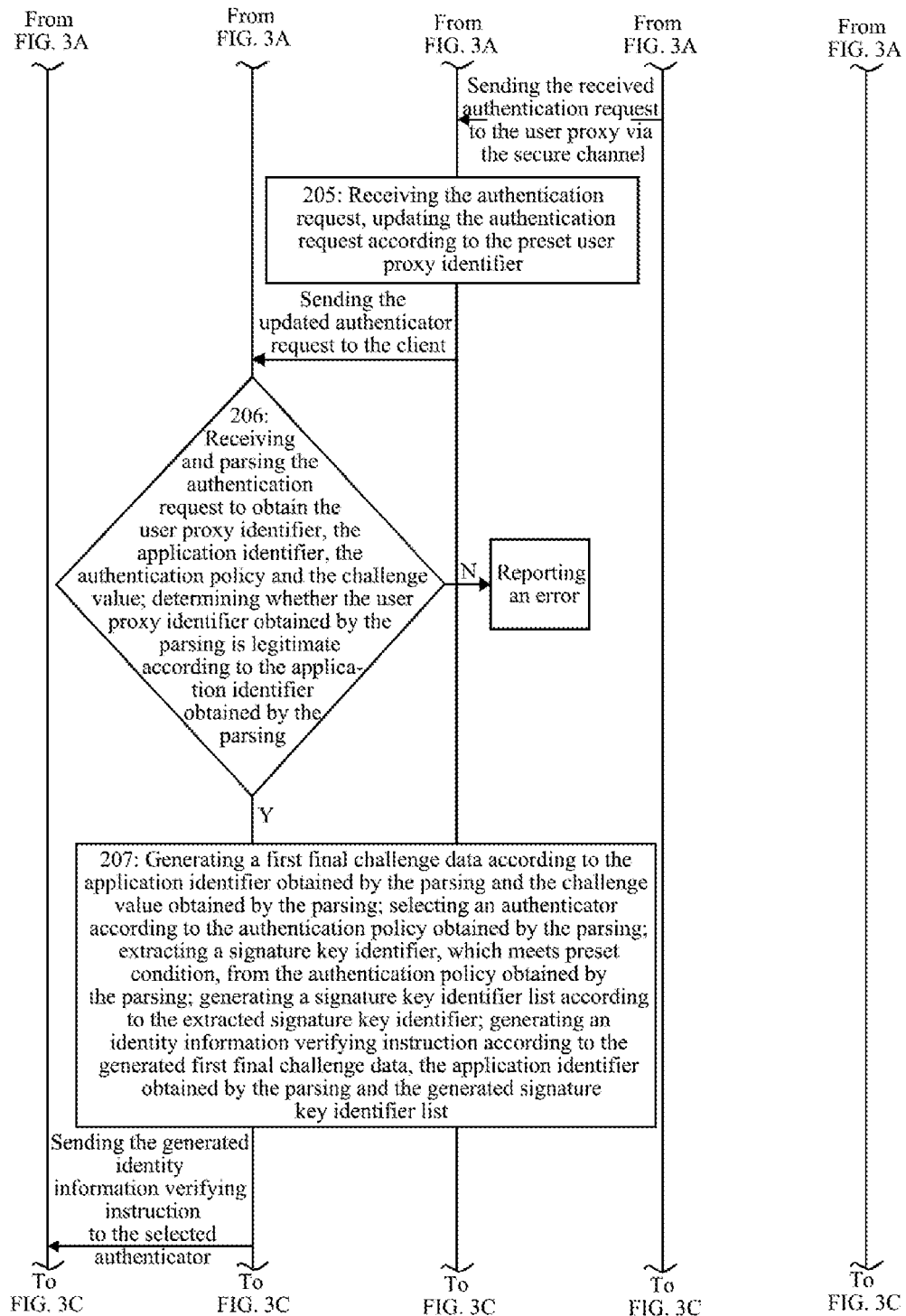
Figure 3D:
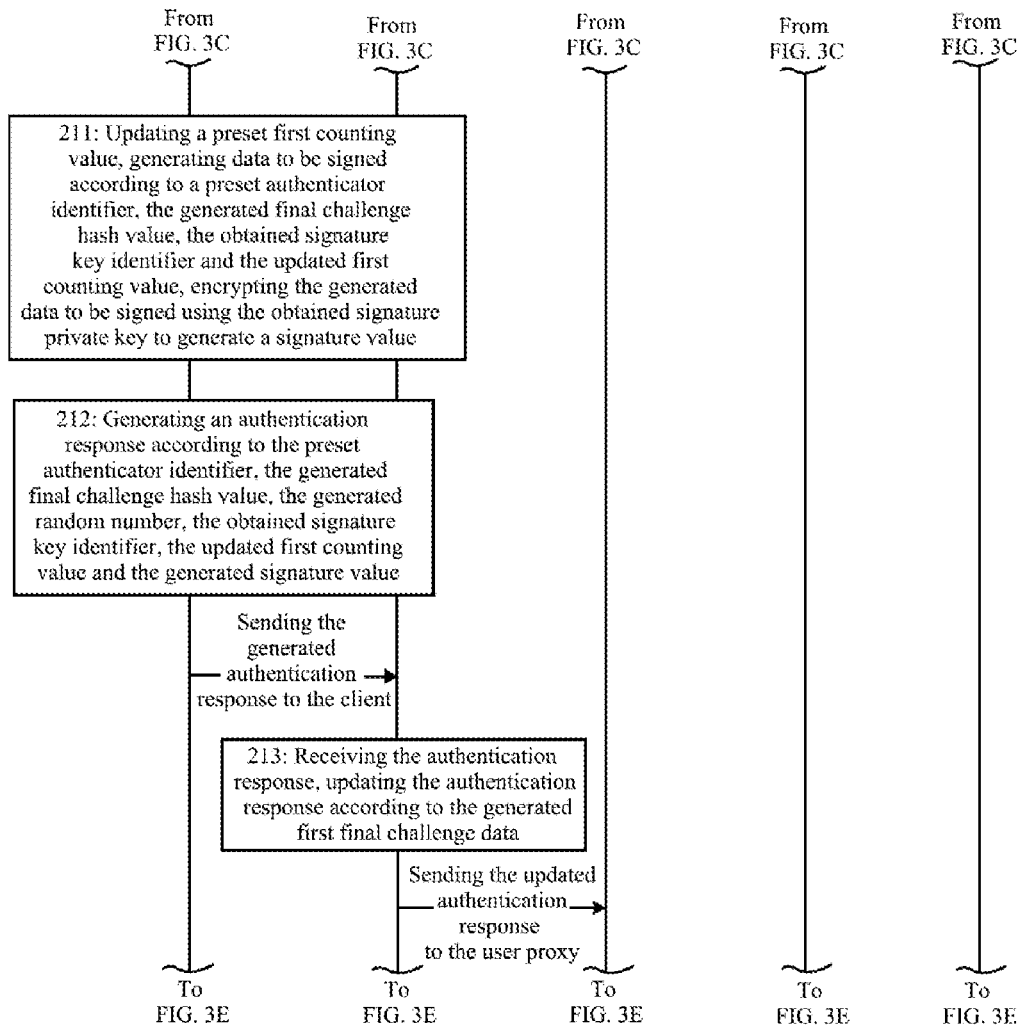
Figure 3E:
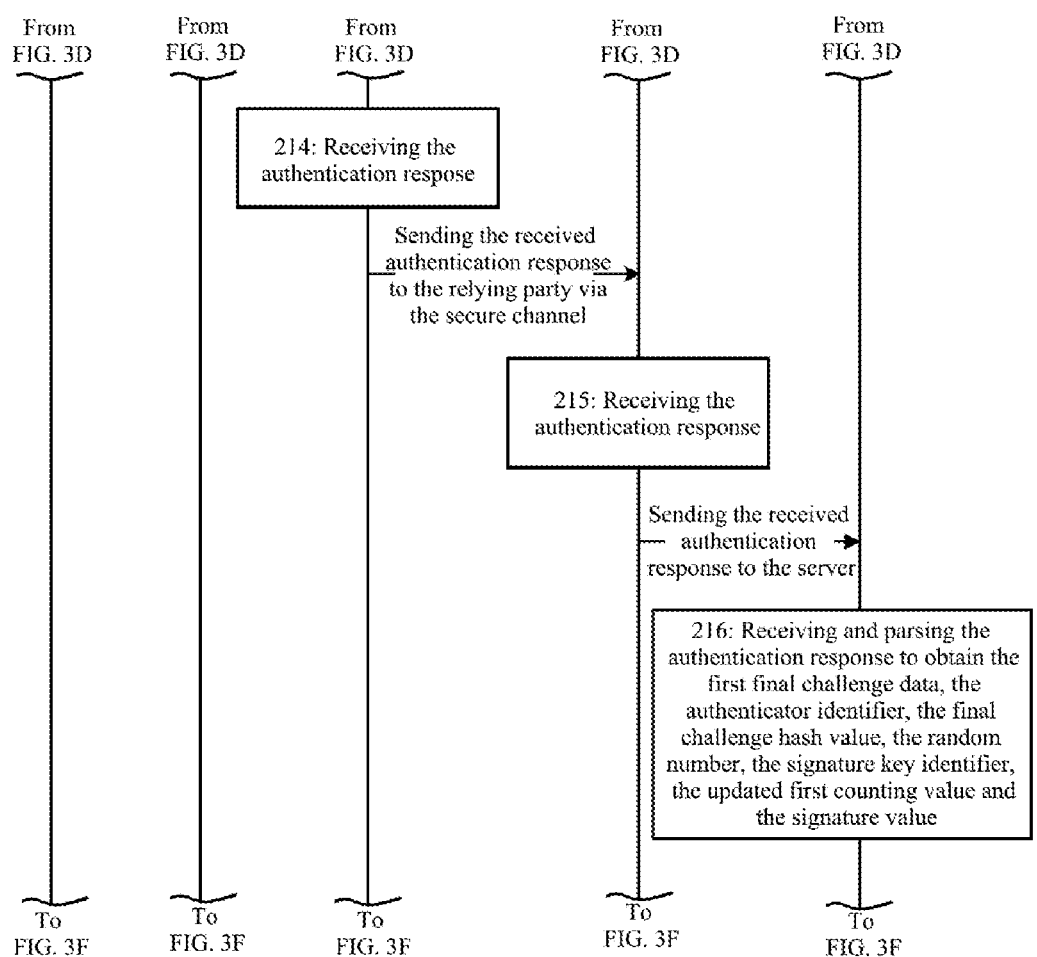
Figure 3F:
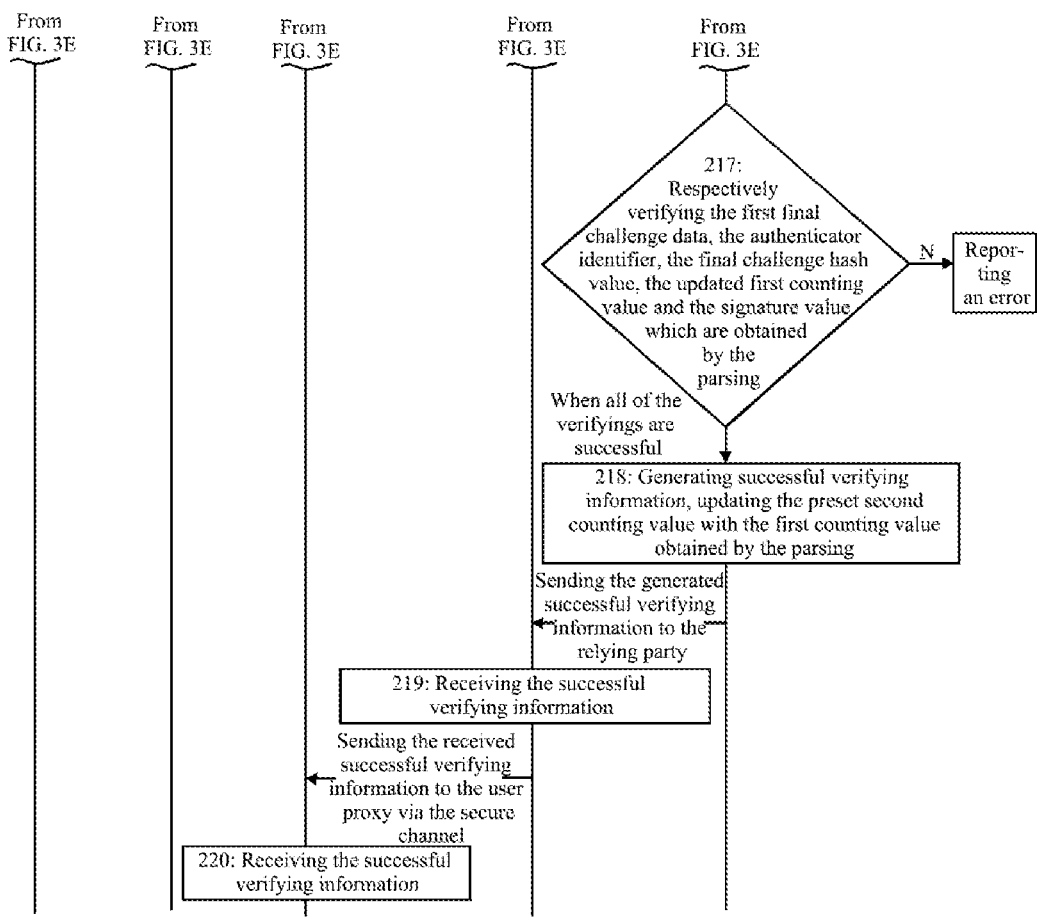
Figure 4A:
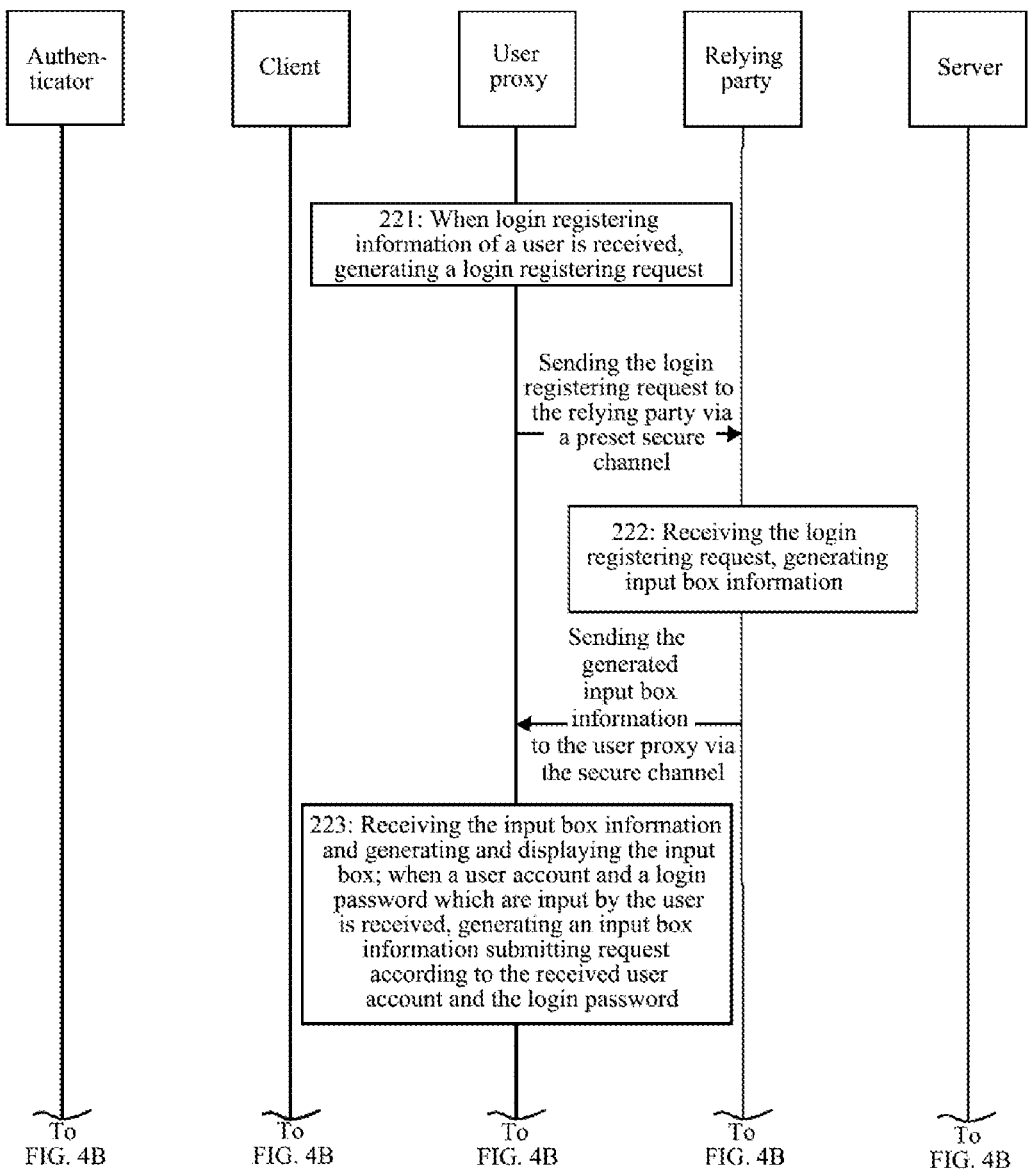
FIG. 4A to FIG. 4F is a flowchart for a working method of a registering system provided by Embodiment 2 of the present disclosure.
Figure 4B:
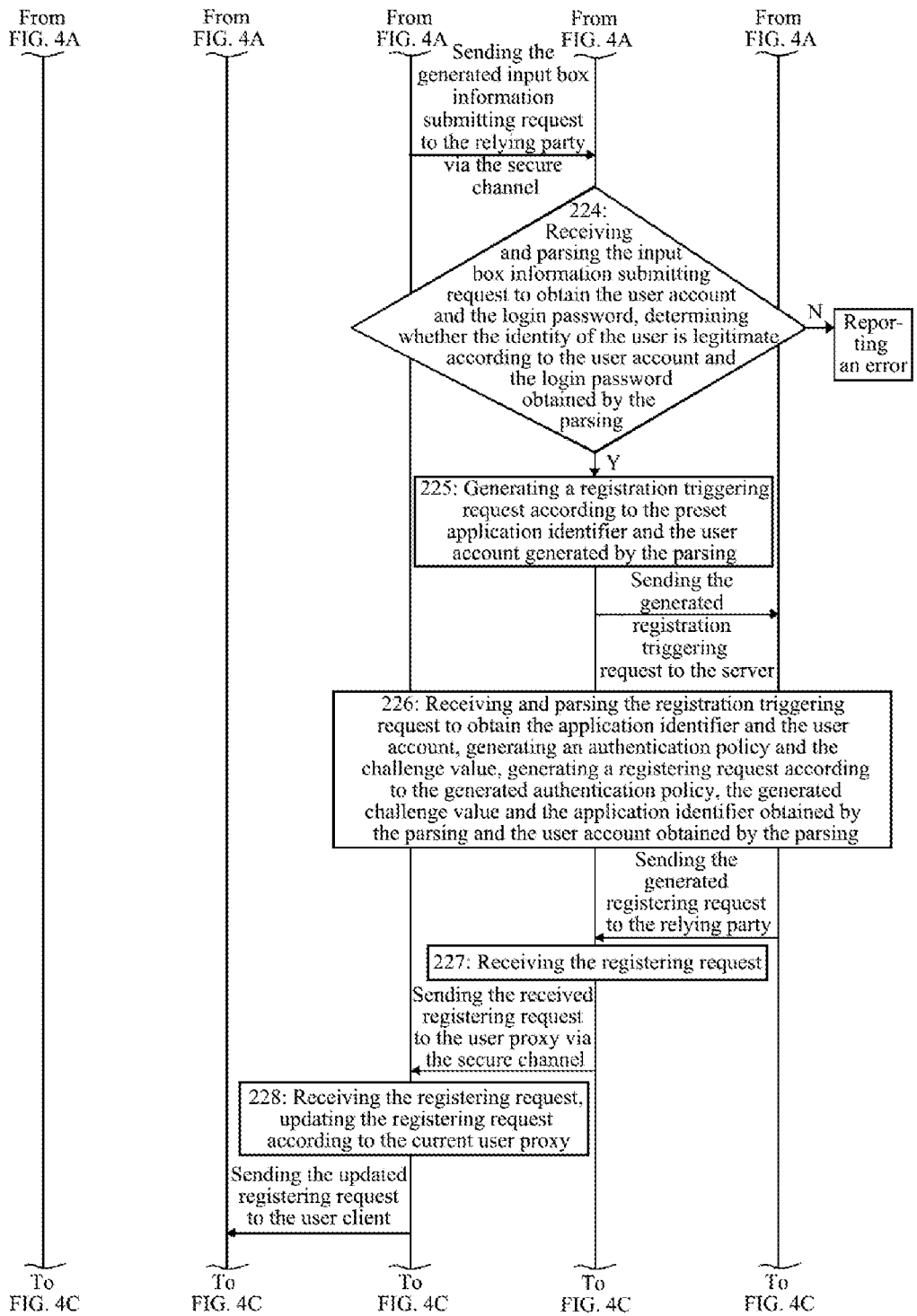
Figure 4C:
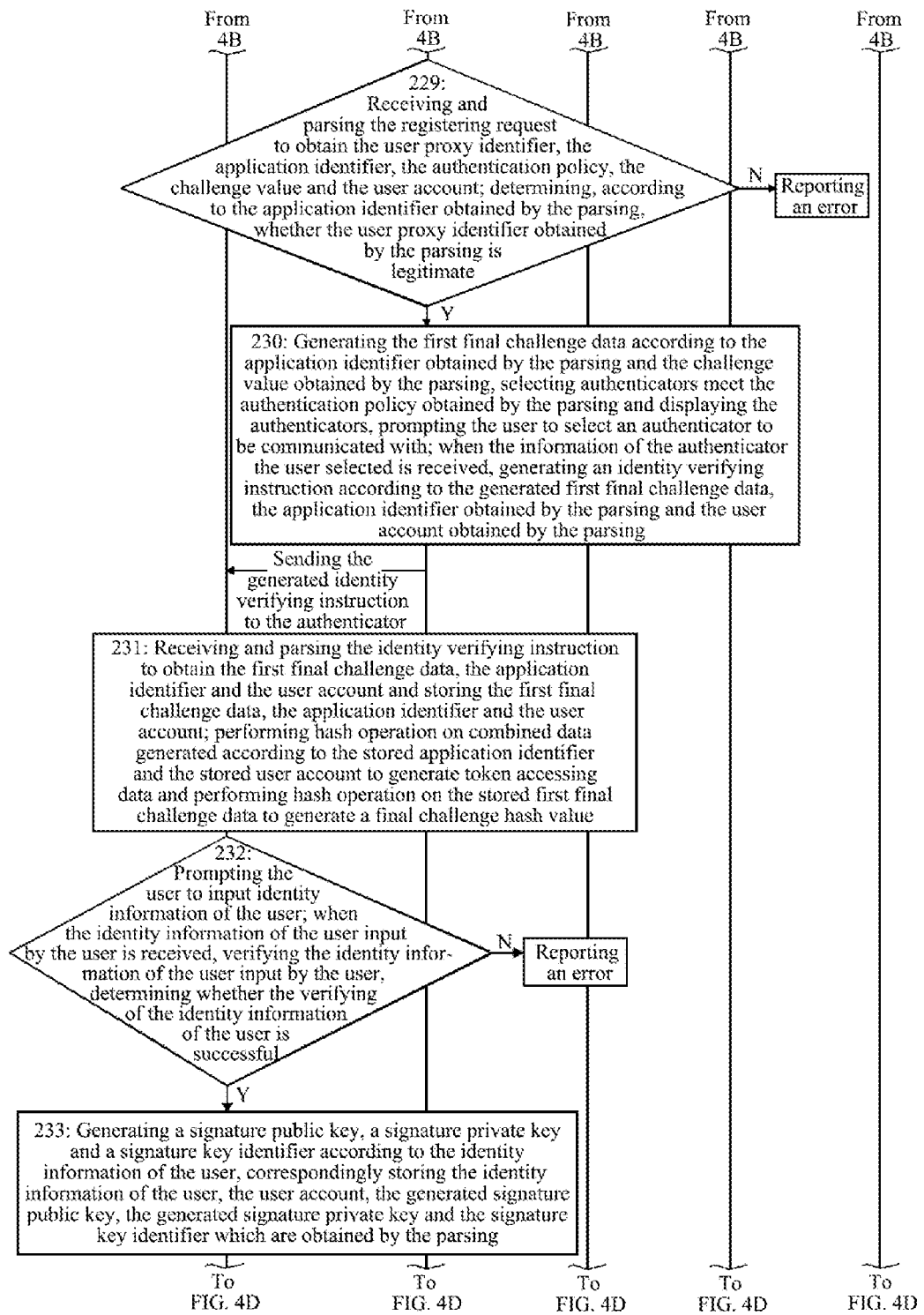
Figure 4D:
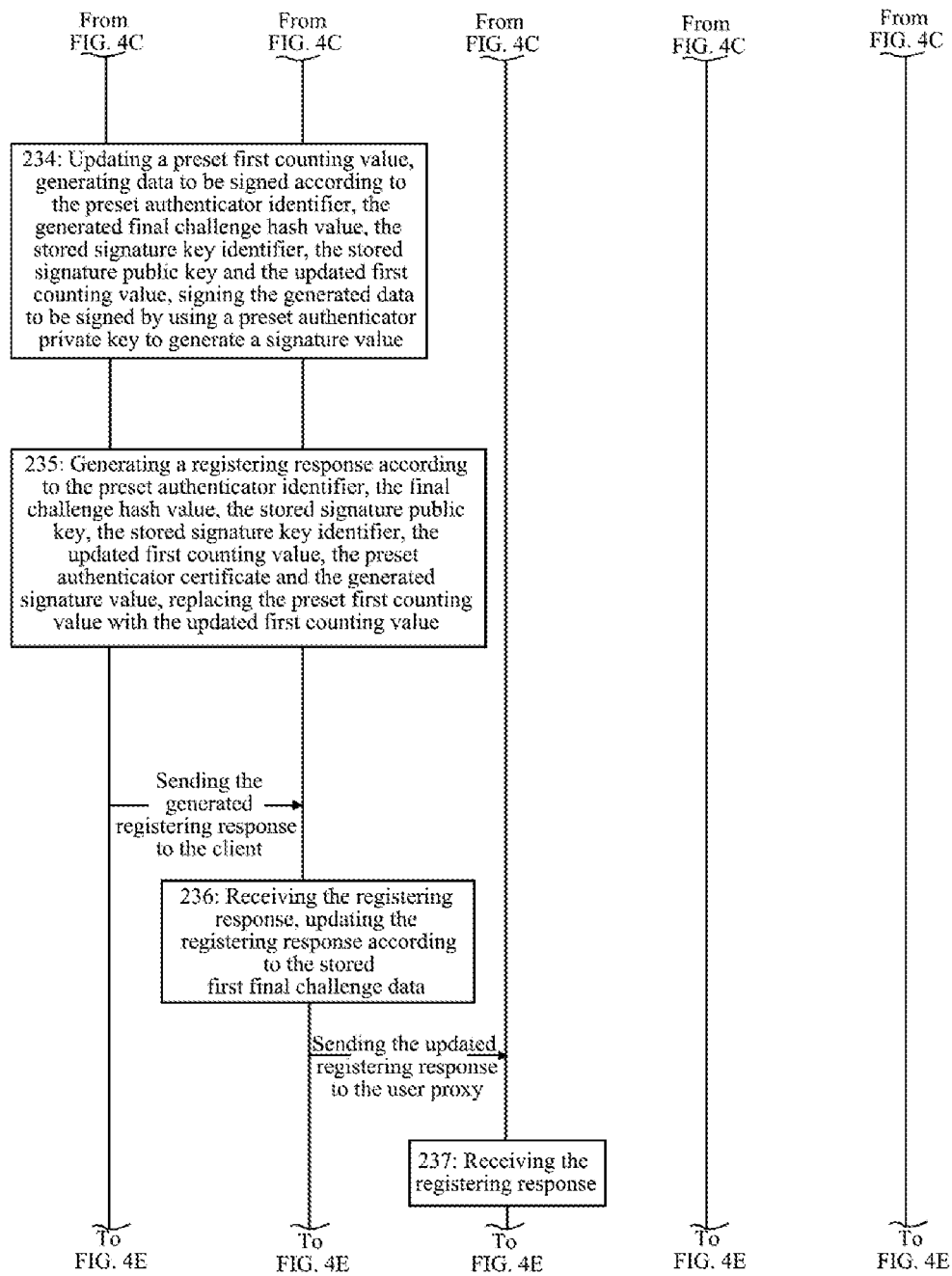
Figure 4E:
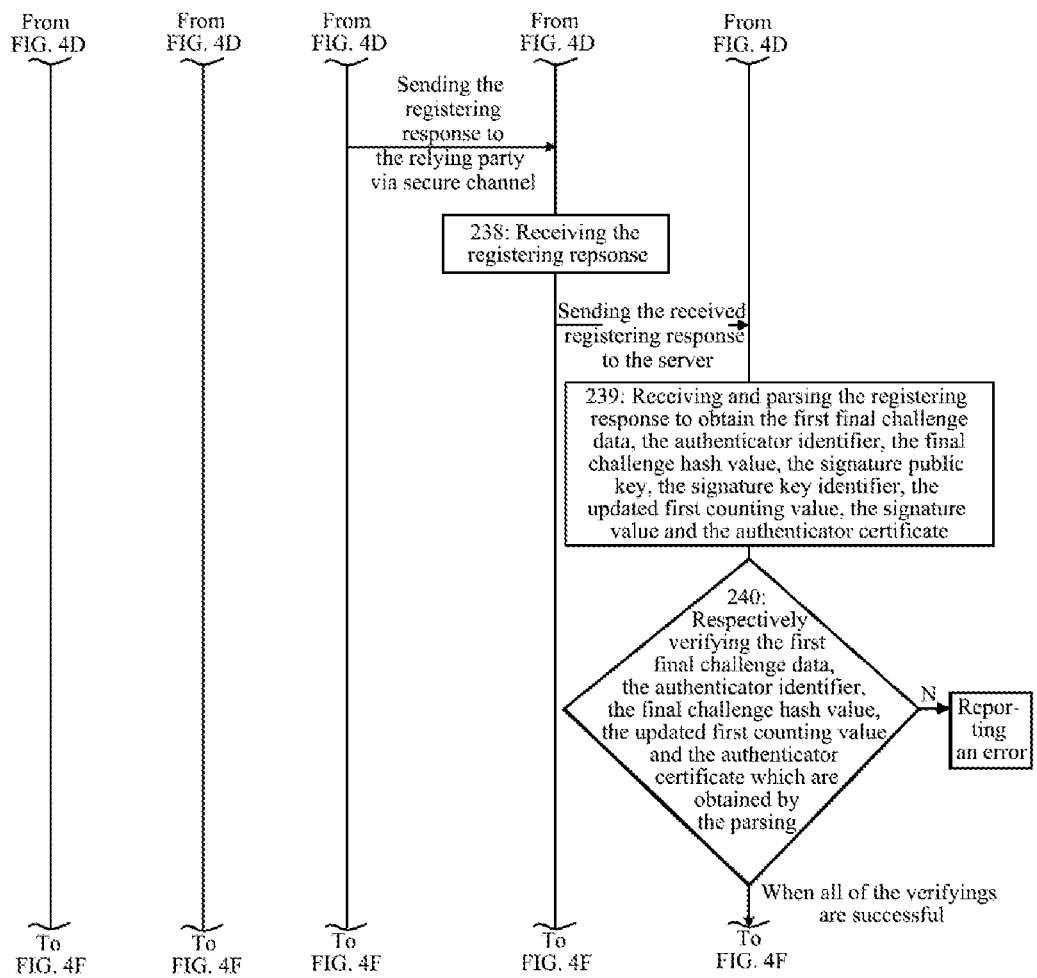
Figure 4F:
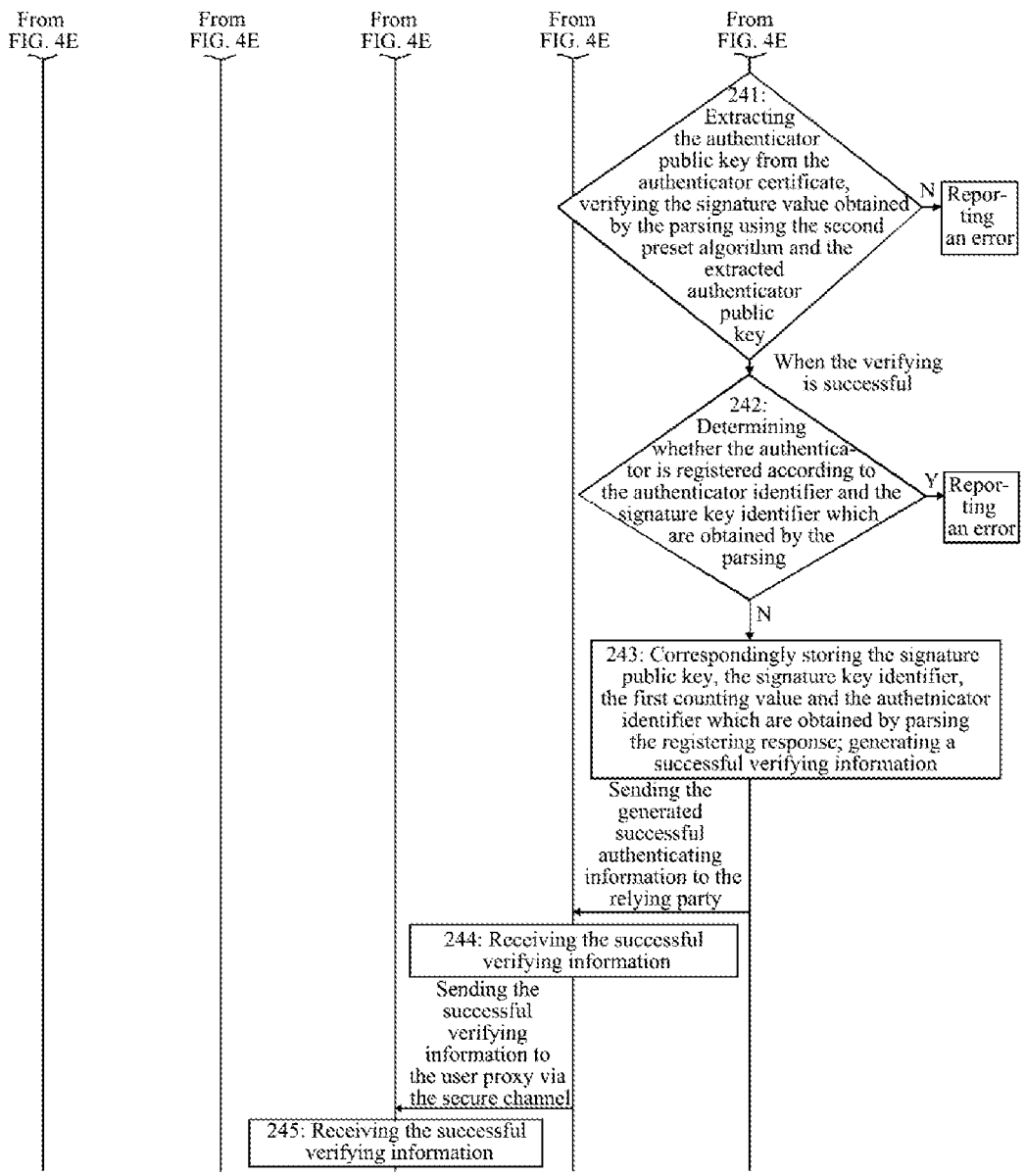

Optionally, in the present embodiment, a registering procedure is performed before Step 101. Embodiment 1 of the present disclosure further provides a working method of a register system. FIG. 2A to FIG. 2C present a flowchart of a working method of a registering system provided by Embodiment 1 of the present disclosure. As shown by FIG. 2A to FIG. 2C, the working method of the registering system includes the following steps:

Step 106, when a relying party receives login registering request information including a user account sent from a client, the relying party generates a registration triggering request according to the user account and a preset application identifier and sends the registration triggering request to the server;

Step 107, the server receives and parses the registration triggering request to obtain the user account and the application identifier; generates an authentication policy and the challenge value according to the registration triggering request, generates a registering request according to the application identifier, the authentication policy, the challenge value and the user account and sends the registering request to the client via the relying party;

Step 108, the client receives and parses the registering request to obtain the application identifier, the authentication policy, the challenge value and the user account, generates a first final challenge data according to the application identifier and the challenge value, generates an identity verifying instruction according to the first final challenge data, the application identifier and the user account and sends the identity verifying instruction to the selected authenticator;

Optionally, in the present embodiment, in Step 108, when the number of the authenticator selected according to the authentication policy is greater than 1, the method further includes the client displays authenticators meet the authentication policy, prompts the user to select an authenticator to be communicated with from all of the displayed authenticators; sends the identity verifying instruction to the selected authenticator when the client receives information of the authenticator selected by the user.

Optionally, in the present embodiment, in Step 108, selecting the authenticator according to the authentication policy specifically includes that the client selects the authenticator of which the version identifier, the authenticator identifier and the user authenticating mode meet the authentication policy.

Step 109, the authenticator receives and parses the identity verifying instruction to obtain a first final challenge data, the application identifier and the user account; generates token accessing data according to the application identifier and the user account; performs hash operation on the first final challenge data to generate a final challenge hash value; obtains identity information of the user and generates a signature public key, a signature private key and a signature key identifier according to the identity information of the user;

Optionally, in the present embodiment, in Step 109, before the generating the token accessing data according to the application identifier and the user account, the method further includes that the authenticator generates a random number;

Correspondingly, the generating the applicator and the user account is specifically that the authenticator generates token accessing data according to the random number, the application identifier and the user account.

Optionally, in the present embodiment, in Step 109, the generating the token accessing data according to the application identifier and the user account is specifically that the authenticator generates combined data according to the application identifier and the user account, performs hash operation on the combined data to generate the token accessing data.

Optionally, in the present embodiment, in Step 109, the obtaining identity information of the user is specifically that the authenticator prompts the user to enter the identity information of the user, determines whether the identity information of the user entered by the user is verified successfully, if yes, generates a signature public key, a signature private key and a signature key identifier according to the identity information of the user, otherwise, reports an error.

Optionally, in the present embodiment, in Step 109, the obtaining identity information of the user is specifically that the authenticator prompts the user to enter identity information of the user, determines whether the identity information of the user entered by the user is received, if yes, generates a signature public key, a signature private key and a signature key identifier according to the identity information of the user, otherwise, reports an error.

Step 110, the authenticator generates data to be signed according to the preset authenticator identifier, the final challenge hash value, the signature key identifier and the signature public key, obtaining a signature value by performing calculation on the data to be signed with a preset authenticator private key, generates a registering response according to the authenticator identifier, the final challenge hash value, the signature public key, the signature key identifier, a preset authenticator certificate and the signature value, sends the registering response to the server via the client and the relying party;

Step 111, the server receives and parses the registering response, and respectively verifies the authenticator identifier, the final challenge hash value, the authenticator certificate and the signature value which are obtained by parsing the registering response, determines whether all results of the verifying are successful, when all of the verifying is successfully, stores the signature public key, the signature key identifier and the authenticator identifier correspondingly, otherwise, reports an error, the procedure ends;

Optionally, in the present embodiment, in Step 110, further includes that the authenticator updates a preset first counting value;

Correspondingly, in Step 110, the authenticator generates the data to be signed according to the preset authenticator identifier, the final challenge hash value, the signature key identifier and the signature public key is specifically that the authenticator generates the data to be signed according to the preset authenticator identifier, the final challenge hash value, the signature public key, the signature key identifier and the updated first counting value;

Correspondingly, in Step 110, the generating a registering response according to the authenticator identifier, the final challenge hash value, the signing pubic key, the signature key identifier, a preset authenticator certificate and the signature value is specifically generating the register response according to the updated first counting value, the authenticator identifier, the final challenge hash value, the signature public key, the signature key identifier, a preset authenticator certificate and the signature value;

Correspondingly, in Step 111, before the determining whether all results of the verifying are successful, the method further includes that the server verifies the first counting value obtained by parsing the registering response;

Correspondingly, in Step 111, when all results of the verifying are successful, the method further includes that the server stores the first counting value.

Further, in the present embodiment, the server verifies the first counting value obtained by parsing the registering response is specifically that the server determines whether the first counting value obtained by parsing the registering response is greater than a preset second counting value, if yes, the verifying is successful; otherwise, the verifying is failed.

Optionally, in the present embodiment, all data between the relying party and the client is transferred via a preset secure channel;

Further, in the present embodiment, the generating a first final challenge value according to the application identifier and the challenge value is specifically that client generates a first final challenge value according to a preset security channel data, the application identifier and the challenge value;

Correspondingly, in Step 111, before the verifying the final challenge hash value obtained by parsing the register response, the method further includes that the server receives a preset security channel data sent by the relying party;

Correspondingly, in Step 111, the verifying the final challenge hash value obtained by parsing the registering response is specifically that the server generates a second final challenge data according to the received security channel data, the application identifier obtained by parsing the registering response and the generated challenge value, performs hash operation on the second final challenge data to generate a hash operation result, determines whether the generated hash operation result is identical to the final challenge hash value obtained by parsing the registering response, if yes, the verifying is successful, otherwise, the verifying is failed.

Optionally, in the present embodiment, in Step 108, after the client receives and parses the registering request to obtain the application identifier, the authentication policy, the challenge value and the user account, the method further includes that the client determines whether a current user proxy identifier is legitimate, if yes, generating the first final challenge data according to the application identifier and the challenge value, otherwise, reporting an error.

Further, in the present embodiment, the client determines whether the current user proxy identifier is legitimate, if yes, generating a first final challenge data according to the application identifier and the challenge value, otherwise, reporting an error specifically includes the following steps:

Step D4, the client obtains a user proxy identifier list obtaining request according to the application identifier and sends the user proxy identifier list obtaining request to the relying party;

Step D5, the relying party receives the user proxy identifier list obtaining request, obtains a user proxy identifier list and sends the user proxy identifier list to the client;

Step D6, the client receives the user proxy identifier list and determines whether a current user proxy identifier exists in the user proxy identifier list, if yes, the current user proxy identifier is legitimate and the client generates the first final challenge data according to the application identifier and the challenge value, otherwise, reports an error.

Optionally, in the present embodiment, the identity information of the user includes fingerprint information and/or palm print information and/or voice information and/or face information and/or iris information and/or vein information and/or PIN code.

Optionally, in the present embodiment, in Step 110, the generating a registering response according to the authenticator identifier, the final challenge hash value, the signature public key, the signature key identifier, a preset authenticator certificate and the signature value is specifically generating the registering response according to the authenticator identifier, the first final challenge data, the final challenge hash value, the signature public key, the signature key identifier, a preset authenticator certificate and the signature value;

Correspondingly, in Step 111, after the server receives and parses the registering response and before the server determines whether all results of the verifying are successful, further includes that the server verifies the first final challenge data obtained by parsing the registering response;

Optionally, in the present embodiment, in Step 110, the sending the registering response via the client and the relying party specifically includes the following steps:

Step C4, the authenticator sends a registering response to the client;

Step C5, the client receives the registering response, attaches the generated first final challenge data in the registering response and updates the registering response and sends the updated registering response to the relying party;

Step C6, the relying party receives the registering response and sends the registering response to the server;

In Step 111, after the server receives and parses the registering response and before the determining whether all results of the verifying are successful, the method further includes that the server verifies the first final challenge data obtained by parsing the registering response;

Further, in the present embodiment, the server verifies the first final challenge data obtained by parsing the registering response is specifically that the server determines whether the application identifier in the first final challenge data obtained by parsing the registering response is identical to the application identifier in the registration triggering request, determines whether the challenge value in the first final challenge data obtained by parsing the registering response is identical to the generated challenge value, if both results of the determining are yes, the verifying is successful and determining whether all results of the verifying is successful; otherwise the verifying is failed.

Optionally, in the present embodiment, in Step 111, the verifying the authentication identifier obtained by parsing the registering response is specifically that the server determines whether the authenticator identifier obtained by parsing the registering response meets the generated authentication policy, when the authenticator identifier obtained by parsing the registering response meets the generated authentication policy, the verifying is successful.

Optionally, in the present embodiment, in Step 111, the verifying the final challenge hash value obtained by parsing the registering response is specifically that the server generates a second final challenge data according to the application identifier obtained by parsing the registration triggering request and the generated challenge value, performs hash operating on the second final challenge data to generate a hash operating result, determines whether the generated hash operation result is identical to the final challenge hash value obtained by parsing the registering response, when the generated hash operation result is identical to the final challenge hash value obtained by parsing the registering response, the verifying is successful.

Optionally, in the present embodiment, in Step 111, the verifying the authenticator certificate obtained by parsing the registering response is specifically that the server uses a third preset algorithm to perform operation on the authenticator certificate obtained by parsing the registering response to obtain an operation result and determines whether operation result is a first preset value, when the operation result is the first preset value, the verifying is successful.

Optionally, in the present embodiment, in Step 111, the verifying the signature value obtained by parsing the registering response is specifically that the server extracts an authenticator public key from the authenticator certificate obtained by parsing the registering response, verifies the signature value obtained by parsing the registering response by using a second preset algorithm with the authenticator public key.

Optionally, in the present embodiment, in Step 111, before the correspondingly storing the signature public key, the signature public key identifier and the authenticator identifier, the method further includes that the server determines whether the authenticator is a registered authenticator according to the authenticator identifier and the signature key identifier which are obtained by parsing the registering response, if yes, reports an error; otherwise, correspondingly stores the signature public key, the signature key identifier and the authenticator identifier.

In the present embodiment, the user proxy is integrated into the client, the operating executed by the user proxy belongs to the client.

It should be understand that the registering process corresponded to the above FIG. 2A to FIG. 2C can be independent from the authenticating process corresponded to the above FIG. 1A to FIG. 1C.

Compared with the prior art, the present disclosure has following advantages: the authenticator stores private information such as signature private key, etc., the server will not obtain private information of the user, which demolishes the risk that the private information of user is stolen or replaced in the transmission process, improves security, avoids security vulnerability that a lot of private information of the user is leaked due to an attacked server.

Embodiment 2

Embodiment 2 of the present disclosure provides a working method of an authenticating system. FIG. 3A to FIG. 3F present a flowchart of the working method of the authenticating system provided by Embodiment 2. As shown by FIG. 3A to FIG. 3F, the method includes the following steps:

Step 201, when a user proxy receives login verifying request information of a user, the user proxy generates a login verifying request, sends the generated login verifying request to a relying part via a preset secure channel;

For example, in the present embodiment, the user proxy includes a browser and an application;

For example, in the present embodiment, the login verifying request is:

https://uafmagdc.cloudentify.com/uafmanager/facets;

Optionally, in the present embodiment, before Step 201, the method further includes that the user proxy and the relying party preset a secure channel according to the TLS protocol (transport layer security protocol); the secure channel is configured to provide secrecy and data integrity; in the present embodiment, all data transmission between the user proxy and the relying party are performed via the secure channel; optionally, security channel data is preset in the user proxy and the relying party;

Step 202, the relying party receives the login verifying request, generates a verifying triggering request according to a preset application identifier and sends the generated verifying triggering request to the server;

Specifically, in the present embodiment, before this step, the relying party presets the application identifier and identifies an address of the relying party;

For example, in the present embodiment, the application identifier is: https://uafmagdc.cloudentify.com/uafmanager/facets;

Step 203, the server receives and parses the authentication triggering request to obtain the application identifier; generates an authentication policy and a challenge value according to the received verifying triggering request, generates a verifying request according to the application identifier obtained by parsing, the generated authentication policy and the generated challenge value and sends the generated authentication request to the relying party;

Optionally, in the present embodiment, the generating an authentication request according to the application identifier obtained by parsing, the generated authentication policy and the generated challenge value is specifically that the server generates an operating header according to the application identifier obtained by parsing, generates the authentication request according to the generated operating header, the generated authentication policy and the generated challenge value; in the present embodiment, the operating header is configured to identify relevant information of registering;

Specifically, in the present embodiment, the challenge value is taken as challenge information for the server to perform message authentication of the authentication response;

Specifically, in the present embodiment, the authentication policy is configured to select an authenticator which permits to perform authenticating operation; the authentication policy includes an accepted part, the accepted part includes matching rule of an authenticator on which the user wanted to perform authenticating, for example, an authenticator identifier, an authenticator version number and user authenticating manner; optionally, the authentication policy further includes a forbidden part, the forbidden part includes unacceptable authenticator information;

Specifically, in the present embodiment, the authenticator identifier is unique for confirming a type of an authenticator; the data format of the authenticator identifier is "V#M", V is abbreviation of vendor, which represents vender of the authenticator, # represents separation character, M is abbreviation of Machine, which represents the type of the authenticator; the authenticator is not sensitive to the case; authenticators with a same authenticator identifier must be from one vender and have a same type; when an authenticator is modified, such as restoring or updating firmware, a new authenticator identifier must be used for the authenticator;

For example, in the present embodiment,

The challenge value is:

"challenge":
"JDJhJDEwJFo3WGZVc2JEYmNOcEo2R3RRdUhvemU";
The version identifier is:"upv":{"major":1,"minor":0};
The authentication policy is:
{"accepted":[[{"aaid":["001B#0001"],"keyIDs":
["tfnuGtYdfDDomxQ5FR
IjNaoTdY2USJwk0y787E1dWh8"]}],[{"aaid":
["001B#0001"],"keyIDs": ["Lw5Tdjpg
krNupQ4J7hjoYBCFVrAMVW4om8yGui13yyw"]}]]};
The authentication request is: [{"challenge":
"JDJhJDEwJFo3WGZVc2JEYmNOcEo2R3RRdUhvemU",
"header":{"appID":"https://uafmagdc.cloudentify.com/uaf-manager/facets","op":"Auth","serverDa ta":
"QXd2aUdKRjRNUExMczdPZ1pOWkZpSGpPSUwxRzk
1LThqN2NkR1FLczV
DSS5NVFV6TURBMk5UZzVNamt3TlEuU2tSS2FFcEV
SWGRLUm04elYwZGFW
bU15U2tWWmJVNVBZMFZ2TWxJelVsSmtWV2gyWl
cxVi4","upv":"major":1,"m inor":0}},"policy":{"ac-cepted":[[{"aaid":["001B#0001"],"keyIDs":["tfnuGtYdfD-Dom xQ5FRIjNaoTdY2USJwk0y787E1dWh8"]}],
[{"aaid":["001B#0001"],"keyIDs":["Lw
5TdjpgkrNupQ4J7hjoYBCFVrAMVW4om8yGui13yyw"]
}]]}}];

Step 204, the relying party receives the authentication request and sends the received authentication request to the user proxy via the secure channel;

Step 205, the user proxy receives the authentication request, updates the authentication request according to the preset user proxy identifier and sends the updated authenticator request to the client;

Optionally, in the present embodiment, updating the authentication request according to the preset user proxy identifier is specifically that the user proxy attaches a preset user proxy identifier in the authentication request to update the authentication request;

For example, in the present embodiment, the user proxy identifier is:

https://uafmagdc.cloudentify.com/uafmanager/facets;

Optionally, in the present embodiment, before Step 201, the method further includes that the user proxy presets a user proxy identifier, the user proxy identifier is for identify the user proxy;

Step 206, the client receives and parses the authentication request to obtain the user proxy identifier, the application identifier, the authentication policy and the challenge value; determines whether the user proxy identifier obtained by parsing is legitimate according to the application identifier obtained by parsing, if yes, executes Step 207; otherwise, reports an error;

Optionally, in the present embodiment, the determining whether the user proxy identifier obtained by parsing is legitimate according to the application identifier obtained by parsing, if yes, executing Step 207; otherwise, reporting an error includes the following steps:

Step D1, the client generates a user proxy identifier list obtaining request according to the application identifier and sends the user proxy identifier list obtaining request to the relying party;

Step D2, the relying party receives the user proxy identifier list obtaining request, obtains a user proxy identifier list, generates a user proxy identifier list obtaining response and sends the user proxy identifier obtaining response to the client;

Step D3, the client receives and parses the user proxy identifier obtaining response to obtain the user proxy identifier list, determines whether a current user proxy identifier exists in the user proxy identifier list, if yes, the user proxy identifier obtained by parsing is legitimate, executes Step 207; otherwise, reports an error;

Step 207, the client generates a first final challenge data according to the application identifier obtained by parsing and the challenge value obtained by parsing; selects an authenticator according to the authentication policy obtained by parsing; extracts a signature key identifier, which meets preset condition, from the authentication policy obtained by parsing; generates a signature key identifier list according to the extracted signature key identifier; generates an identity information verifying instruction according to the generated first final challenge data, the application identifier obtained by parsing and the generated signature key identifier list; sends the generated identity information verifying instruction to the selected authenticator;

Optionally, in the present embodiment, the client generates the first final challenge data according to the application identifier obtained by parsing and the challenge value obtained by parsing is specifically that the client generates the first final challenge data according to the security channel data, the application identifier obtained by parsing and the generated challenge value;

Optionally, in the present embodiment, after the generating the signature key identifier list according to the extracted signature key identifier, the method further includes that the client determines whether the generated signature key identifier list is void, if yes, reports an error; otherwise, generates the identity information verifying instruction according to the generated first final challenge data, the application identifier obtained by parsing and the generated signature key identifier list;

For example, the first final challenge data is: JDJhJDEwJFo3WGZVc2JEYmNOcEo2R3RRdUhvemU;

The signature key identifier is: tfnuGtYdfDDomxQ5FRIjNaoTdY2USJwk0y787E1d Wh8;

the signature key identifier list is: Lw5TdjpgkrNupQ4J7hjoYBCFVrAMVW4om8yGui13y yw;

the identity information verifying instruction is: "tfnuGtYdfDDomxQ5FRIjNaoTdY2USJwk0y787E1d Wh8","Lw5TdjpgkrNupQ4J7hjoYBCFVrAMVW4om8yGui13yyw";

the security channel data is: {"appID":"https://uafmagdc.cloudentify.com/uafmanager/facets","challenge":"JDJhJDEwJFo3WGZVc2JEYmNOcEo2R3RRdUhvemU","channelBinding":{ },"facetID":"an droid:apk-key-hash:qxKId88vHySV2KnQQYDrDX7bbU4"};

Step 208, the authenticator receives and parses the identity information verifying instruction to obtain a first final challenge data, the application identifier and the signature key identifier list and stores the first final challenge data, the application identifier and the signature key identifier list; performs hash operation on combined data generated according to the stored application identifier to generate token accessing data; performs hash operation on the stored first final challenge data to generate the final challenge hash value;

Optionally, in the present embodiment, after the authenticator receives and parses the identity information verifying instruction to obtain the first final challenge data, the application identifier and the signature key identifier list, the method further includes that the authenticator displays the application identifier obtained by parsing;

Optionally, in the present embodiment, after the performing hash operation on the combined data generated according to the stored application identifier to generate the token accessing data, the method further includes that the authenticator updates the token accessing data by performing hash operation on the combined data generated according to the stored application identifier to generate the token accessing data;

For example, in the present embodiment, the final challenge hash value is:
c3ddccb16a7aaba0d4e1c6ead64fdc5e05e5aa3f6f33a9a7 3676274c8d0cd1d 4;

Step 209, the authenticator prompts the user to input identity information of the user, when receiving the identity information of the user input by the user, the authenticator verifies the identity information of the user input by the user, determines whether the identity information of the user is verified successfully, if yes, executes Step 210, otherwise, reports an error;

Specifically, in the present embodiment, the identity information of the user includes fingerprint information and/or palmprint information and/or voice information and/or face information and/or iris information and/or vein information or PIN code; in the present embodiment, PIN (Personal Identification Number) code, user recognized user identity;

Step 210, the authenticator searches for target original signature key data from all stored original signature key data according to a stored signature key identifier list, a stored application identifier and the generated token accessing data; obtains a signature private key and signature key identifier which are corresponding to the target original signature key data according to the searched target original signature key data;

Optionally, in the present embodiment, before Step 201, a registering process is performed; in the registering procedure, the authenticator generates the original signature key data and stores the original signature key data;

For example, in the present embodiment, the signature key identifier is:
2f0e53763a6092b36ea50e09ee18e860108556b00c556e 289bcc86ba2d77cb 2c;

Optionally, in the present embodiment, the authenticator searches for the target original signature key data from all stored original signature key data according to the stored signature key identifier list, the stored application identifier and the generated token accessing data includes the following steps:

Step a1, the authenticator searches for original signature key encrypted data according to the stored signature key identifier list and the stored application identifier;

Step a2, the authenticator decrypts the original signature key encrypted data according to a preset wrapper key to obtain an original signature key data list;

Step a3, the authenticator screens the original signature key data list obtained by decrypting according to the updated token accessing data, determines the number of the original signature key data included in the screened original signature key data list, when the number of the remained original signature key data is 0, reports an error; when the number of the remained original signature key data is 1, executes Step a4; when the number of the remained original signature key data is greater than 1, executes Step a5;

Step a4, the authenticator records the original signature key data as the target original signature key data, obtains a signature private key and a signature key identifier which correspond to the target original signature key data according to the searched target original signature key data;

Step a5, the authenticator extracts the user account in the remained original signature key data, respectively encrypts all original signature key data according to the preset wrapper key to obtain original signature key encrypted data; generates a label list according to all the extracted user account and the original signature key encrypted data corresponding to the user account; extracts the user accounts in the labels of the generated label list and generates a user account list, executes Step a6;

Step a6, the authenticator prompts a user to select a target user account from the user account list, searches for the original signature key encrypted data corresponding to the target user account according to the target user account; goes back to Step a2;

Correspondingly, in the present embodiment, before Step 201, a registering process is performed. In the registering process, the authenticator stores the original signature key encrypted data; the wrapper key is preset in the authenticator; generally the wrapper key is symmetrical key;

Correspondingly, in Step 208 of the present embodiment, after the performing hash operation on the combined data generated according to the stored application identifier to generate the token accessing data, the method further includes that the authenticator performs hash operation on the combined data according to the application identifier and the generated token accessing data to update the token accessing data;

For example, in the present application, the signature key identifier is:

2f0e53763a6092b36ea50e09ee18e860108556b00c556e 289bcc86ba2d77cb 2c;

Step 211, the authenticator updates a preset first counting value, generates data to be signed according to a preset authenticator identifier, the generated final challenge hash value, the obtained signature key identifier and the updated first counting value, encrypts the generated data to be signed with the obtained signature private key to generate a signature value;

Specifically, in the present embodiment, the authenticator is factory preset with an authenticator identifier; the authenticator identifier is unique for confirming a type of an authenticator; the data format of the authenticator identifier is "V#M", V is abbreviation of vendor, which represents vender of the authenticator, # represents separation character, M is abbreviation of Machine, which represents the type of the authenticator; the authenticator is not sensitive to the case; authenticators with a same authenticator identifier must be from one vender and have a same type; when an authenticator is modified, such as restoring or updating firmware, a new authenticator identifier must be used for the authenticator;

Optionally, in the present embodiment, before Step 201, a registering process is performed. In the registering process, the authenticator and the server store the first counting value.

Specifically, in the present embodiment, the authenticator is factory preset with an authenticator private key and an authenticator public key;

For example, in the present embodiment, the random number is:

The first counting value is: 19010000;
The updated first counting value is: 1a010000;
The authenticator identifier is: 001B#0001;
The data to be signed is:
043eb2000b2e09003030314223303030310e2e0500000 10101000f2e200045528633c0
1eceb8396b0d71f25d4991559ce682923017e851f5ece5405 5f1910a2e2000c3ddccb16
a7aaba0d4e1c6ead64fdc5e05e5aa3f6f33a9a73676274c8d0 cd1d4102e0000092e20002
f0e53763a6092b36ea50e09ee18e860108556b00c556e289 bcc86ba2d77cb2c04012000
5b6faca11e63a4f35d96afb7fb8731a6f39a271acb9fea64b6 6fb94187d776b50d2e04001 a010000;

The signature value is:
055aa28c9c549dab235dece56fc5d7c9ed470c36332e7ce4 bc779475d4e6ad453aaeb21
927c9250a4c990c216def9222750fd80463db3e6e4dafe115 80e8576e;

Step 212, the authenticator generates an authentication response according to the preset authenticator identifier, the generated final challenge hash value, the generated random number, the obtained signature key identifier, the updated first counting value and the generated signature value and sends the authentication response to the client;

Step 213, the client receives the authentication response, updates the authentication response according to the generated first final challenge data and sends the updated authentication response to the user proxy;

Optionally, in the present embodiment, the updating the authentication response according to the stored first final challenge data is specifically that the client updates the authentication response by attaching the first final challenge data to the authentication response;

Step 214, the user proxy receives the authentication response and sends the received authentication response to the relying part via the secure channel;

Step 215, the relying party receives the authentication response and sends the received authentication response to the server;

Step 216, the server receives and parses the authentication response to obtain the first final challenge data, the authenticator identifier, the final challenge hash value, the random number, the signature key identifier, the updated first counting value and the signature value;

Step 217, the server respectively verifies the first final challenge data, the authenticator identifier, the final challenge hash value, the updated first counting value and the signature value which are obtained by parsing, when all the verifying is successful, executes Step 218; otherwise, reports an error;

Optionally, in the present embodiment, Step 217 is specifically that the server determines whether the application identifier in the first final challenge data obtained by parsing is identical to the application identifier obtained by parsing the authentication triggering request, determines whether the challenge value in the first final challenge data obtained by parsing is identical to the generated challenge value; determines whether the authenticator identifier obtained by parsing meets the generated authentication policy; determines whether the first counting value obtained by parsing is greater than a preset second counting value; searches for a signature public key according to the authenticator and the signature key which are obtained by parsing, verifies the signature value obtained by parsing with the searched signature public key, determines whether the verifying result is the first preset value; if all results of the determining are yes, executes Step 218; otherwise, reports an error;

Specifically, in the present embodiment, a registering process is performed before Step 201; in the registering process, the server presets the second counting value; the server stores the signature public key;

Further, when the client generates the first final challenge data according to the preset security channel data, the application identifier obtained by parsing and the generated challenge value in Step 207, correspondingly, before all results of the determining are yes in Step 217, further includes that the client determines whether the security channel data in the first final challenge data is identical to the received security channel data sent from the relying party; correspondingly, before the present step, the relying party sends the security channel data to the client; the server receives the security channel data sent by the relying party;

Step 218, the server generates successful verifying information, updates the preset second counting value with the first counting value obtained by the parsing and sends the successful verifying information to the relying party;

Optionally, a registering process is performed before Step 201. In the registering process, the server stores a second counting value, in the present embodiment, which is the same as that the server presets the first counting value;

For example, in the present embodiment, the first counting value is 19010000;

The second counting value is 1a010000;

Step 219, the relying party receives the successful verifying information and sends the received successful verifying information to the user proxy via the secure channel;

Step 220, the user proxy receives the successful verifying information.

In the present embodiment, the authentication response received by the server includes the first final challenge data, the manner of generating the authentication response including the first final challenge data is specifically that the client attaches the final challenge data to the authentication response generated by the authenticator, and the server verifies the first final challenge data;

Optionally, the authentication response received by the server includes the first final challenge data; another manner of generating the authentication response including the first final challenge data is specifically that the authenticator generates the authentication response according to the preset authenticator identifier, the generated first final challenge data, the generated final challenge hash value, the obtained signature key identifier, the updated first counting value and the generated signature value; then a role played by the server is transporting the authentication response generated by the authenticator to the relying party;

Optionally, in the above two manners, the server authenticates the first final challenge data is specifically that the server determines whether the application identifier in the first final challenge data obtained by parsing is identical to the application identifier in the authentication triggering request, determines whether the challenge value in the first final challenge data obtained by parsing is identical to the generated challenge value;

In addition, the authentication response received by the server may not include the first final challenge data, that the server verifies the final challenge signature value is specifically that the server generates a second final challenge data according to the application identifier obtained by parsing and the generated challenge value, performs hash operation on the generated second final challenge data to obtain a final challenge hash value, determines whether the final challenge hash value obtained by parsing the authentication response is identical to the generated final challenge hash value, if yes, the verifying for the final challenge hash value is successful; otherwise, the verifying for the final challenge hash value is failed;

In the present embodiment, the user proxy and the client are independent from each other;

Optionally, in the present embodiment, a registering process is performed before Step 201, Embodiment 2 of the present disclosure further provides a working method of a registering system; FIG. 4A to FIG. 4F present a flowchart of the working method of the registering system provided by Embodiment 2 of the present disclosure. As shown by FIG. 4A to FIG. 4F, the method includes the following steps:

Step 221, when a user proxy receives login registering information of a user, the user proxy generates a login registering request and sends the login registering request to the relying party via a preset secure channel;

For example, in the present embodiment, the login registering request is: https://uaftest.cloudentify.com:18443/login;

For example, in the present embodiment, the user proxy may be an application;

Optionally, in the present embodiment, the user proxy may be a browser, then Step 221 can be replaced by Step 221-1: the user proxy receives a relying party source accessing address and an URL which entered by the user, the user proxy sends the relying party source accessing address and the URL entered by the user via a secure channel; the uniform resource locator (URL) is brief representation of a method for obtaining location of resource from the internet and accessing the resource, which is a standard resource address on the Internet;

Optionally, in the present embodiment, before Step 221, the method further includes that the user proxy and the relying party preset secure channel according to the TLS protocol (security transport layer protocol); the secure channel is configured to provide secrecy and data integrity; in the present embodiment, all data transmission between the user proxy and the relying party needs to be performed via the secure channel; optionally, security channel data is preset in the user proxy and the relying party;

Step 222, the relying party receives the login registering request, generates input box information and sends the generated input box information to the user proxy via the secure channel;

For example, in the present embodiment, the input box information is:

<formaction="https://uaftest.cloudentify.com:18443/login">
  <labelfor="uname"><b>Username</b></label>
  <inputtype="text"name="uname"required>
  <labelfor="psw"><b>Password</b></label>
  <inputtype="password"name="psw" required>
  <buttontype="submit">Login</button>
</form>;

Correspondingly, when Step 221 is replaced by Step 221-1, Step 222 is replaced with Step 222-1: the relying party receives the accessing address and the URL of the resource of the relying party and generates the input box information;

Step 223, the user proxy receives the input box information and generates and displays the input box information; when the user proxy receives a user account and a login password which are input by the user, the user proxy generates an input box information submitting request according to the received user account and the login password, sends the input box information submitting request to the relying party via a secure channel;

For example, in the present embodiment, the user account is lenovok52;

The login password is ******;

Step 224, the relying party receives and parses the input box information submitting request to obtain the user account and the login password, determines whether the identity of the user is legitimate, if yes, executes Step 225, otherwise, reports an error;

Optionally, in the present embodiment, in Step 224, the determining whether the identity of the user is legitimate according to the user account and the login password which are obtained by parsing is specifically that the relying party determines whether a user account obtained by parsing is stored, if no, reports an error, if yes, the relying party determines whether the login password obtained by parsing is identical to the login password corresponding to the stored user account, if yes, executes Step 225, otherwise, reports an error; in the present embodiment, a process of registering an account at the relying party for a user is performed before Step 221. The relying party stores the user account and the login password correspondingly in the process of registering an account;

Step 225, The relying party generates a registration triggering request according to a preset application identifier and a user account obtained by parsing and sends the generated registration triggering request to the server;

Optionally, in the present embodiment, before Step 225, the relying party presets the application identifier for identifying the address of the relying party;

For example, in the present embodiment,

The user account is "lenovok52";

The registration triggering request is https://uaftest.cloudentify.com:18443/facets;

Step 226, the server receives and parses the registration triggering request to obtain the application identifier and the user account, generates an authentication policy and a challenge value, generates a registering request according to the generated authentication policy, the generated challenge value and the application identifier obtained by parsing and the user account obtained by parsing and sends the registering request to the relying party;

Specifically, in the present embodiment, the challenge value is taken as challenge information for a server to perform message authentication of subsequent registering response;

Specifically, in the present embodiment, the authentication policy can be preset in the server; the authentication policy is configured to select an authenticator which is permitted to perform registering operation; the authentication policy includes an accepting part, the accepting part includes a match rule (for example, an authenticator identifier, an authenticator version number and a user authenticating manner) of an authenticator with which a user is wanted to bond; optionally, the authentication policy further includes a forbidden part which is unacceptable information of the authenticator and information (for example, an authenticator identifier and a signature key identifier) of the authenticator with which the user account is registered under the current user account to indicate repeat registering is not allowed.

Specifically, in the present embodiment, the authenticator identifier is unique for confirming a type of an authenticator; the data format of the authenticator identifier is "V#M", V is abbreviation of vendor, which represents vender of the authenticator, # represents separation character, M is abbreviation of Machine, which represents the type of the authenticator; the authenticator is not sensitive to the case; authenticators with a same authenticator identifier must be from one vender and have a same type; when an authenticator is modified, such as restoring or updating firmware, a new authenticator identifier must be used for the authenticator;

For example, in the present embodiment,

The authentication policy is: "policy":{"accepted": [[{"aaid":["17EF#6010"]}],[{"aaid":["FFFF#5201"]}]]};

The challenge value is: "challenge": "eVphUG43Nnh6UXJMSzNGMStSb2w";

Step 227, the relying party receives the registering request and sends the received registering request to the user proxy via the secure channel;

Step 228, the user proxy receives the registering request, updates the registering request according to the current user proxy and sends the updated registering request to the user client;

Optionally, in the present embodiment, the updating the registering request according to the preset user proxy is specifically that the user proxy attaches a preset user proxy identifier to the registering request to update the registering request; before Step 221, the user proxy presets the user proxy identifier, the user proxy identifier is configured to identify the user proxy;

For example, in the present embodiment, the user proxy identifier is https://uaftest.cloudentify.com:18443;

Step 229, the client receives and parses the registering request to obtain a user proxy identifier, the application identifier, the authentication policy, the challenge value and the user account; determines whether the user proxy identifier obtained by parsing according to the application identifier obtained by parsing is legitimate, if yes, executes Step 230; otherwise, reports an error;

Optionally, in the present embodiment, the client determines whether the user proxy identifier obtained by parsing according to the application identifier obtained by parsing is legitimate, if yes, executes Step 230; otherwise, reports an error specifically includes the following steps:

Step D4, the client generates a user proxy identifier list obtaining request according to the application identifier and sends the user proxy identifier list obtaining request to the relying party;

Step D5, the relying party receives the user proxy identifier list obtaining request, obtains the user proxy identifier list, generates a user proxy identifier list obtaining response and sends the user proxy identifier list obtaining response to the client;

Step D6, the client receives and parses the user proxy identifier list obtaining response, determines whether the obtained user proxy identifier is legitimate, if yes, executes Step 230, otherwise, reports an error;

Step 230, the client generates the first final challenge data according to the application identifier obtained by parsing and the challenge value obtained by parsing, selects authenticators meet the authentication policy obtained by parsing and displaying the authenticators, prompts the user to select an authenticator to be communicated with; when the information of the authenticator that the user selected is received, generates an identity verifying instruction according to the generated first final challenge data, the application identifier obtained by parsing and the user account obtained by parsing and sends the identity verifying instruction to the authenticator;

Optionally, in the present embodiment, the selecting the authenticators meet the authentication policy obtained by parsing is specifically that the client selects an authenticator whose version identifier, authenticator identifier and the authenticating manner meet the rule of the authentication policy;

Optionally, in the present embodiment, the client generates the first final challenge data according to the application identifier obtained by parsing and the generated challenge value is specifically that the client generates the first final challenge data according to a preset secure challenge data, the application identifier obtained by parsing and the generated challenge value;

For example, in the present embodiment, the first final challenge data is: eVphUG43Nnh6UXJMSzNGMStSb2w;

The identity verifying instruction is: 023460000D280100010A2E2000e8ab97dbcaea1f6367d5c 74c3293bda3516c54f5386 89ccd0e24b17c5bf2d786062809001enovok520718020007 3E05282000c99a03bf1f013 46c1809476df9bd0dbf195086e99ece4b81115335205af67 b67;

Step 231, the authenticator receives and parses the identity verifying instruction to obtain the first final challenge data, the application identifier and the user account and stores the first final challenge data, the application identifier and the user account; performs hash operation on the combined data generated according to the stored application identifier and the stored user account to generate token accessing data and performs hash operation on the stored first final challenge data to generate the final challenge hash value;

Optionally, in the present embodiment, before the performing the hash operation on the combined data generated according to the stored application identifier and the stored user account to generate the token accessing data, the method further includes: generating a random number; correspondingly, the performing hash operation on the combined data generated according to the stored application identifier and the stored user account to generate the token accessing data is specifically that the authenticator performs hash operation on the combined data generated according to the generated random number, the stored application identifier and the stored user account to generate the token accessing data;

Optionally, in the present embodiment, after the performing hash operation on the combined data generated according to the stored application identifier and the stored user account to generate the token accessing data, the method further includes that the authenticator generates the combined data according to the stored application identifier and the generated token accessing data, performs hash operation on the generated combined data to update the token accessing data;

Optionally, in the present embodiment, after the authenticator receives and parses the identity verifying instruction to obtain the first final challenge data, the application identifier and the user account, the method further includes that the authenticator displays the application identifier obtained by parsing;

For example, in the present embodiment, the token accessing data is:
3be9d6748aac338dba64fceb59c7903c48fda285c3e489a 42ecf17b84fa0804 6;

The final challenge hash value is:
e8ab97dbcaea1f6367d5c74c3293bda3516c54f538689cc d0e24b17c5bf2d7 86;

Step 232, the authenticator prompts the user to input identity information of the user; when the authenticator receives the identity information of the user input by the user, verifies the identity information of the user input by the user, determines whether the verifying of the identity information of the user is successfully, if yes, executes Step 233; otherwise, reports an error;

Optionally, in the present embodiment, the verifying the identity information of the user input by the user is specifically that the authenticator determines whether the identity information of the user input by the user is the same as the identity information of the user corresponding to the user account obtained by parsing; before Step 232, a binding processing is performed, the authenticator receives the identity information of the user input by the user and stores the identity information of the user correspondingly to the user account and presets the identity information of the user and the user account in the authenticator;

Optionally, in the present embodiment, the verifying the identity information of the user input by the user according to the user account obtained by parsing and determining whether the verifying is successful can be replaced with determining whether the identity information of the user input by the user is received by the authenticator;

Further, in the present embodiment, before Step 232, the method further includes that the authenticator prompts the user to select a manner of identity information of the user, when the authenticator receives the manner of the identity information of the user which the user selects, executes Step 232;

Optionally, in the present embodiment, in Step 232, the verifying the identity information of the user input by the user, determining whether the verifying of the identity user information of the user is successfully is specifically that the authenticator extracts identity essential information of the identity information of the user input by the user, determines whether the extracted identity essential information is identical to the identity essential information corresponding to the user account obtained by parsing;

Optionally, in the present embodiment, the identity information of the user includes fingerprint information and/or palmprint information and/or voice information and/or facial information and/or iris information and/or vein information and/or PIN code; in the present embodiment, personal identification number (PIN) code is used for recognizing user identity;

Step 233, the authenticator generates a signature public key, a signature private key and a signature key identifier according to the identity information of the user, correspondingly stores the identity information of the user, the user account obtained by parsing, the generated signature public key, the generated signature private key and the generated signature key identifier;

For example, in the present embodiment, the signature public key is:
049cf30d829cf85d52c53475c75bda74d9f736d8ecf925e 7673ebf9b2b328ad 55bd81087956b54b6c56f048bee21da9bd9b16162f7abeb 9a9103a9cdd26b58890e;

The signature public key identifier is:
3be9d6748aac338dba64fceb59c7903c48fda285c3e489a 42ecf17b84fa0804 6;

Optionally, in the present embodiment, after Step 233, further includes that the authenticator generates original signature key data according to the application identifier obtained by parsing, the user account obtained by parsing, the generated token accessing data, the stored signature private key and the stored signature key identifier and stores the original signature key data;

Step 234, the authenticator updates a preset first counting value, generates the data to be signed according to the preset authenticator identifier, the generated final challenge hash value, the stored signature key identifier, the stored signature public key and the updated first counting value, signs the generated data to be signed by using a preset authenticator private key to generate a signature value;

Optionally, specifically, in the present embodiment, the authenticator is factory preset with an authenticator identifier; the authenticator identifier is unique for confirming a type of an authenticator; the data format of the authenticator identifier is "V#M", V is an abbreviation of vendor, which represents vendor of the authenticator, # represents a separation character, M is an abbreviation of Machine, which represents the type of the authenticator; the authenticator is not sensitive to the case; authenticators with a same authenticator identifier must be from one vender and have a same type; when an authenticator is modified, such as restoring or updating firmware, a new authenticator identifier must be used for the authenticator;

Optionally, in the present embodiment, the authenticator is factory preset with the authenticator private key and the authenticator public key;

For example, in the present embodiment, the authenticator identifier is 17EF#6010;

The first counting value is 0179;

The signature value is ccd59ddc4d1fdbe6063a7bc5b3ffb825ae19306326ab2057c80acd8b2cae1b9ab28c2384
01d8eb9f0e35ee1345eb708c35b699b4d0d37deddfcd62fee
c359d33;

Step 235, the authenticator generates a registering response according to the preset authenticator identifier, the final challenge hash value, the stored signature public key, the stored signature key identifier, the updated first counting value, the preset authenticator certificate and the generated signature value, replaces the preset first counting value with the updated first counting value and sends the registering response to the client;

Optionally, in the present embodiment, the authenticator certificate is issued by a reliable center of the authenticator;

For example, in the present embodiment, the authenticator certificate is:
3082020d308201b4020200a4300906072a8648ce3d040
1308191310b3009
06035504061302434e3110300e06035504081307426569
6a696e6673110300e0603550
40713074265696a696e6731163014060355040a130d6e6f
6b6e6f6b6c6162732e636e3
10c300a060355040b14035226443110300e060355040313
07526f636b2043413126302
406092a864886f70d0109011617726f636b2e77616e6740
6e6f6b6e6f6b6c6162732e63
6e301e170d31353132323330333303233325a170d3235313
232303033303233325a308
193310b3009060355040613024344e3110300e060355040
813074265696a696e673110
300e060355040713074265696a696e6673116301406035
5040a130d6e6f6b6e6f6b6c61
62732e636e310c300a060355040b14035226443112301006
035504031409313745462
3363031303126302406092a864886f70d01090116177726f
636b2e77616e6e67406e6f6b6
e6f6b6c6162732e636e63059301306072a8648ce3d0201060
82a8648ce3d03010703420
004fd9fab234294a40c2b0dcb23471c719abf1a6404dd19de
9aa873d863500d3b98ad5a
7a75b66a45ca0906d771fc464faae7dedb0647d553103753
a80e979606f0300906072a8
648ce3d0401034800304502210093880a0d5c3ad90d74540
113feae499189b44f21709a55
2b56b6b3da0eb0e7e29702203fda81610fe7f41da7d1ea2ec
856a58c17626bfed8d1c60b d8e188fd1ec558fe;

Step 236, the client receives the registering response, updates the registering response according to the stored first final challenge data and sends the updated registering response to the user proxy;

Optionally, in the present embodiment, the updating the registering response according to the stored first final challenge data is specifically that the client adds the first final challenge data to the registering response to update the registering response;

Step 237, the user proxy receives the registering response and sends the registering response to the relying party via the secure channel;

Step 238, the relying party receives the registering response and sends the received registering response to the server;

Step 239, the server receives and parses the registering response to obtain the first final challenge data, the authenticator identifier, the final challenge hash value, the signature public key, the signature key identifier, the updated first counting value, the signature value and the authenticator certificate;

Step 240, the server respectively verifies the first final challenge data, the authenticator identifier, the final challenge hash value, the updated first counting value and the authenticator certificate which are obtained by parsing, when all results of the verifying are successful, executes Step 241; otherwise, reports an error;

Optionally, in the present embodiment, Step 240 is specifically that the server determines whether the application identifier in the first final challenge data obtained by parsing is identical to the application identifier in the registering request, determines whether the challenge value in the first final challenge data obtained by parsing is identical to the challenge value in the registering request; determines whether the authenticator identifier obtained by parsing meets the authentication policy in the registering request; generates a second final challenge data according to the application identifier in the registering request and the challenge value in the registering request, performs hash operation on the generated second final challenge data to generate an operation result and determines whether the final challenge hash value obtained by parsing is identical to the generated operation result; determines whether the updated first counting value is greater than a second counting value; determines whether an operation result which is obtained by using a third preset algorithm to perform operation on a root certificate of the authenticator and the authenticator certificate is the first preset value; if all of the determining results above are yes, executes Step 241; otherwise, reports an error;

Further, in the present embodiment, in Step 230, when the client generates the first final challenge data according to the preset secure challenge data, the application identifier generated by parsing and the generated challenge value, correspondingly, in Step 240, before all of the determining results above are yes, the method further includes that the client determines whether the security channel data in the first final challenge data is identical to the security channel data sent by the received relying party; correspondingly, before the present step, the relying party sends the security channel data to the client; the server receives the security channel data sent by the relying party;

Optionally, in the present embodiment, the authenticator certificate of the authenticator includes the root certificate;

Step 241, the server extracts the authenticator public key from the authenticator certificate, verifies the signature value obtained by parsing by using the second preset algorithm and the extracted authenticator public key, when the verifying is successful, executes Step 242; otherwise, reports an error;

Optionally, in the present embodiment, Step 241 is specifically that the authenticator extracts the authenticator public key from the authenticator certificate, verifies the signature value obtained by parsing by using the second preset algorithm and the extracted authenticator public key, when the verifying result is not 0, executes Step 242; when the authenticating result is 0, reports an error;

For example, in the present embodiment, the authenticator public key is 04fd9fab234294a40c2b0dcb23471c719abf1a6404dd19de9
aa873d863500d3b98ad5a7
a75b66a45ca0906d771fc464faae7dedb0647d553103753a8
0e979606f0;

Optionally, in the present embodiment, Step 241 and Step 240 can also be replaced with each other;

Step 242, the server determines whether the authenticator is registered according to the authenticator identifier and the signature key identifier which are obtained by parsing, if yes, reports an error; otherwise, executes Step 243;

Step 243, the server correspondingly stores the signature public key, the signature key identifier, the first counting value and the authenticator identifier which are obtained by parsing the registering response; generates a successful authenticating information and sends the generated successful authenticating information to the relying party;

Step 244, the relying party receives the successful authenticating information and sends the successful authenticating information to the user proxy via the secure channel;

Step 245, the user proxy receives the successful authenticating information.

Optionally, in the present embodiment, the registering response received by the server includes the first final challenge data, the manner for generating the registering response including the first final challenge data is specifically that the client attaches the final challenge data to the registering response generated by the authenticator, then the server authenticates the first final challenge data;

Optionally, the registering response received by the server includes the first final challenge data; another manner for generating the registering response including the first final challenge data is specifically that the authenticator generates the registering response according to the preset authenticator identifier, the first final challenge data, the final challenge hash value, the stored signature public key, the stored signature key identifier, the updated first counting value, the final challenge hash value, the stored signature public key, the stored signature key identifier, the updated first counting value, the preset authenticator certificate and the generated signature value; the client only plays a role of forwarding the registering response generated by the authenticator to the relying party;

Optionally, in the present embodiment, in the two manners above, the server authenticates the first final challenge data is specifically that the server determines whether the application identifier in the first final challenge data obtained by parsing is identical to the application identifier in the registering request, determines whether the challenge value in the first final challenge data obtained by parsing is identical to the challenge value in the registering request;

In addition, the registering response received by the server may not include the first final challenge data, then the server verifies the final challenge signature value is specifically that the server generates a second final challenge data according to the application identifier in the registering request and the challenge value in the registering request, performs hash operation on the generated second final challenge data to obtain an operation result and determines whether the final challenge hash data obtained by parsing the registering response is identical to the generated operation result.

In the present embodiment, the user proxy is integrated in the client or is set independently.

It should be understood that the registering process corresponding to FIG. 4A to FIG. 4F can be independent from the authenticating process corresponding to the FIG. 3A to FIG. 3F.

Compared with the prior art, the present disclosure has following advantages: the authenticator stores private information such as user signature private key, etc., while the server cannot obtain the private information of the user, which eliminates the risk that the user private information may be stolen or replaced in the transmission process, improves security of authentication and effectively avoids loss of leaking user private information caused by an attacked server.

In addition, when a user uses bio-identity information for registering, the user completes identity authenticating by providing bio-identity information to an authenticator, which avoids trouble caused by forgetting password or code, eliminates or reduces dependence of a password or code and improves user experience.

In addition, in the present embodiment, the client and the relying party can perform data transmission via secure channel, the data transmission via the secure channel is encrypted data; even if the data is intercepted, the intercepted data is encrypted data, therefore the original data will not be leaked, which insures security of the transferred data; in the present embodiment, the client determines legitimacy of the current user proxy identifier according to the application identifier, insures legitimacy of the user proxy and makes the registering process and the authenticating process to be safer.

Compared with the prior art, the present disclosure has the following advantages: the authenticator stores private information such as user signature private key, etc. while the server cannot get the private information of the user, which eliminates the risk that the user private information may be stolen or replaced in a transmission process, improves security of the authentication and effectively avoids vulnerability of leaking user private information caused by an attacked server.

Embodiment 3

Figure 5:
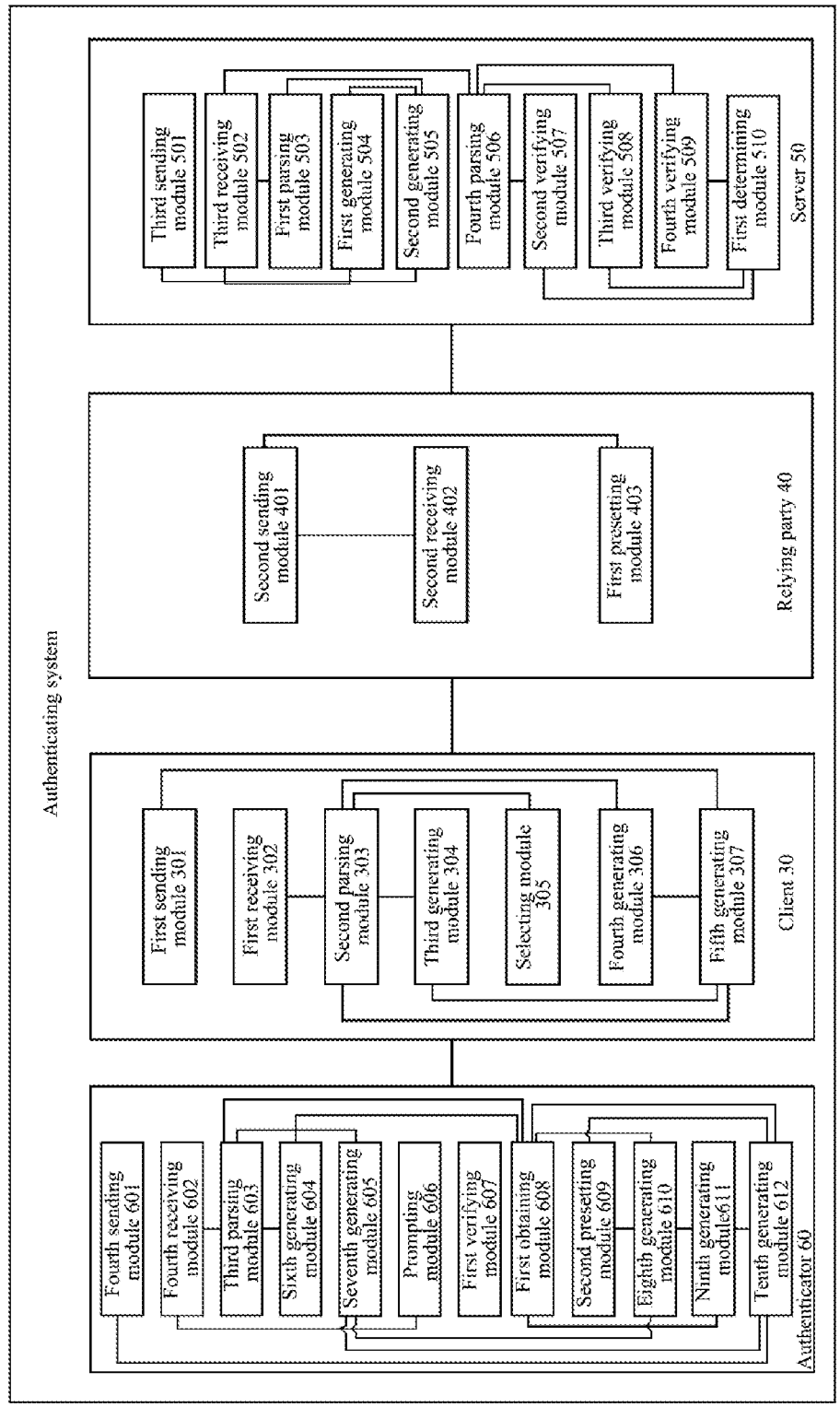
FIG. 5 is a block diagram of an authenticating system provided by Embodiment 3 of the present disclosure.

Embodiment 3 of the present application provides an authenticating system; FIG. 5 provides a block diagram of the authenticating system provided by Embodiment 3; as shown by FIG. 5, an authenticator 60, a client 30, a relying party 40 and a server 50 are included;

The client 30 includes a first sending module 301, a first receiving module 302, a second parsing module 303, a third generating module 304, a selecting module 305, a fourth generating module 306 and a fifth generating module 307;

The relying party 40 includes a second sending module 401, a second receiving module 402 and a first presetting module 403;

The server 50 includes a third sending module 501, a third receiving module 502, a first parsing module 503, a first generating module 504, a second generating module 505, a fourth parsing module 506, a second authenticating module 507, a third authenticating module 508, a fourth authenticating module 509 and a first determining module 510;

The authenticator 60 includes a fourth sending module 601, a fourth receiving module 602, a third parsing module 603, a sixth generating module 604, a seventh generating module 605, a prompting module 606, a first verifying module 607, a second presetting module 609, a first obtaining module 608, an eighth generating module 610, a ninth generating module 611 and a tenth generating module 612;

The first preset module 403 is configured to preset an application identifier;

The second sending module 401 is configured to send a authentication triggering request including the application identifier preset by the first presetting module 403 to the server 50;

The third receiving module 502 is configured to receive an authentication triggering request, which includes the application identifier preset by the first presetting module 403, sent by the second sending module 401;

The parsing module 503 is configured to parse the authentication triggering request received by the third receiving module 502 to obtain the application identifier;

The first generating module 504 is configured to generate an authentication policy and a challenge value according to the authentication triggering request received by the third receiving module 502;

The second generating module 505 is configured to generate an authentication request according to the application identifier, which is obtained by the first parsing module 503 by parsing the authentication triggering request received by the third receiving module 502, the authentication policy and the challenge value which are generated by the first generating module 504;

The third sending module 501 is configured to send the authentication request generated by the second generating module 505 to the relying party 40;

The second receiving module 402 is further configured to receive the authentication request sent by the third sending module 501;

The second sending module 401 is further configured to send the authentication request received by the second receiving module 402 to the client 30;

The first receiving module 302 is configured to receive the authentication request sent by the second sending module 401;

The second parsing module 303 is configured to parse the authentication request received by the first receiving module 302 to obtain the application identifier, the authentication policy and the challenge value;

The third generating module 304 is configured to generate a first final challenge data according to the application identifier and the challenge value which are obtained by parsing the authentication request by the second parsing module 303;

The selecting module 305 is configured to select the authenticator 60 according to the authentication policy obtained by parsing the authentication request by the second parsing module 303;

The fourth generating module 306 is configured to generate a signature key identifier list according to the authentication policy obtained by the second parsing module 303 by parsing the authentication request;

Optionally, the fourth generating module 306 is specifically configured to extract a signature key identifier which meets a preset condition from the authentication policy obtained by the second parsing module 303 by parsing the authentication request, generate the signature key identifier list according to the extracted signature key identifier.

The fifth generating module 307 is configured to generate an identity information verifying instruction according to the first final challenge data generated by the third generating module 304, the application identifier obtained by the second parsing module 303 by parsing the authentication request and the signature key identifier list generated by the fourth generating module 306;

The first sending module 301 is configured to send the identity information verifying instruction generated by the fifth generating module 307 to the authenticator 60 selected by the selecting module 305;

The fourth receiving module 602 is configured to receive the identity information verifying instruction sent by the first sending module 301;

The third parsing module 603 is configured to parse the identity information verifying instruction received by the fourth receiving module 602 to obtain the first final challenge data, the application identifier and the signature key identifier list;

The sixth generating module 604 is configured to generate the token accessing data according to the application identifier obtained by the third parsing module 603 by parsing the identity information verifying instruction;

The seventh generating module 605 is configured to perform calculation on the first final challenge data which is obtained by the third parsing module 603 by parsing the identity information verifying instruction, to generate a final challenge hash value;

The prompting module 606 is configured to prompt the user to input the identity information of the user;

The fourth receiving module 602 is further configured to receive identity information of the user input by the user;

The first verifying module 607 is configured to verify the identity information of the user input by the user which is received by the fourth receiving module 602, when the verifying is failed, report an error, the procedure ends;

The first obtaining module 608 is configured to obtain a signature private key and a signature key identifier according to the signature key identifier list and the application identifier which are obtained by the third parsing module 603 by parsing the identity information verifying instruction received by the fourth receiving module 602, and the token accessing data generated by the sixth generating module 604;

The second presetting module 609 is configured to preset an identifier of the authenticator 60;

The eighth generating module 610 is configured to generate data to be signed according to the identifier of the authenticator 60 preset by the second presetting module 609, the final challenge hash value generated by the seventh generating module 605 and the signature key identifier obtained by the first obtaining module 608;

The ninth generating module 611 is configured to generate a signature value by perform calculation on the data to be signed generated by the eighth generating module 610 using the signature private key obtained by the first obtaining module 608;

The tenth generating module 612 is configured to generate an authentication response according to the identifier of authenticator 60 preset by the second preset module 609, the final challenge hash value generated according to the seventh generating module 605, the signature key identifier obtained by the first obtaining module 608 and the signature value generated by the ninth generating module 611;

The fourth sending module 601 is configured to send the authentication response generated by the tenth generating module 612 to the client 30;

The first receiving module 302 is further configured to receive the authentication response sent by the fourth sending module 601;

The first sending module 301 is further configured to send the authentication response received by the first receiving module 302 to the relying party 40;

The second receiving module 402 is further configured to receive the authentication response sent by the first sending module 301;

The second sending module 401 is further configured to send the authentication response received by the second receiving module 402 to the server 50;

The third receiving module 502 is further configured to receive the authentication response sent by the second sending module 401;

The fourth parsing module 506 is configured to parse the authentication response received by the third receiving module 502 to obtain the identifier of authenticator 60, the final challenge hash value, the signature key identifier and the signature value;

The second authenticating module 507 is configured to verify the identifier of authenticator 60 which is obtained by the fourth parsing module 506 by parsing the authentication response;

Optionally, the second authenticating module 507 is specifically configured to determine whether the identifier of authenticator 60 which is obtained by the fourth parsing module 506 by parsing the authentication response, meets the authentication policy generated by the first generating module 504, if yes, the authentication for the identifier of the authenticator is successful; otherwise, the authentication for the identifier of the authenticator is failed.

The third authenticating module 508 is configured to authenticate the final challenge hash value obtained by the fourth parsing module 506 by parsing the authentication response;

Optionally, the third authenticating module 508 is specifically configured to generate final challenge comparing data according to the application identifier obtained by the first parsing module 503 by parsing the authentication request and the challenge value generated by the first generating module 504, performs hash operation on the final challenge comparing data to obtain a final challenge comparing hash value, determines whether the final challenge hash value obtained by parsing the authentication response is identical to the final challenge comparing hash value, if yes, the authentication of the final challenge hash value is successful; otherwise, the authentication of the final challenge hash value is failed.

The fourth authenticating module 509 is configured to verify the signature value obtained by the fourth parsing module 506 by parsing the authentication response according to the signature key identifier obtained by the fourth parsing module 506 by parsing the authentication response;

Optionally, the fourth authenticating module 509 is specifically configured to search for a signature public key according to the identifier of the authenticator 60 obtained by the fourth parsing module 506 by parsing the authentication response and the signature key identifier, verify the signature value using the searched signature public key.

The first determining module 510 is configured to determine whether all results of the verifying made by the second authenticating module 507, the third authenticating module 508 and the fourth authenticating module 509 are successful, if yes, the verification is successful, otherwise, the verification is failed.

Optionally, all data transmission between the relying party 40 and the client 30 is performed via a preset secure channel;

Optionally, the client 30 further includes a third preset module;

The third preset module is configured to preset the security channel data;

The third generating module 304 is specifically configured to generate the first final challenge data according to the security channel data preset by the third preset module, the application identifier and the challenge value which are obtained by the second parsing module 303 by parsing the authentication request;

The second sending module 401 is further configured to send the security channel data preset by the third preset module to the server 50;

The third receiving module 502 is further configured to receive the security channel data sent by the second sending module 401;

The third authenticating module 508 includes a first generating unit, a second generating unit and a first determining unit;

The first generating unit is configured to generate a second final challenge data according to the security channel data received by the third receiving module 502, the application identifier obtained by the first parsing module 503 by parsing the authentication request and the challenge value generated by the first generating module 504;

The second generating unit is configured to perform hash operation on the second final challenge data generated by the first generating unit to generate a hash operation result;

The first determining unit is configured to determine whether the hash operation result generated by the second generating unit is identical to the final challenge hash value obtained by the fourth parsing module 506 by parsing the authentication response, if yes, the verifying of the final challenge hash value is successful; otherwise, the verifying of the final challenge hash value is failed.

Optionally, the client 30 further includes a second determining module and a first error reporting module;

The second determining module is configured to determine whether a current user proxy identifier is legitimate according to the application identifier obtained by the second parsing module 303 by parsing the authentication request;

Optionally, the second determining module includes a third generating unit and a second determining unit; the relying party 40 further includes a second obtaining module;

The third generating module is configured to generate a user proxy identifier list obtaining request according to the application identifier obtained by the second parsing module 303 by parsing the authentication request;

The first sending module 301 is further configured to send the user proxy identifier list obtaining request generated by the third generating unit to the relying party 40;

The second receiving module 402 is further configured to receive the user proxy identifier list obtaining list sent by the first sending module 301;

The second obtaining module is configured to obtain a user proxy identifier list after the second receiving module 402 receives the user proxy identifier list obtaining request;

The second sending module 401 is further configured to send the user proxy identifier list obtained by the second obtaining module to the client 30;

The second receiving module 302 is further configured to receive the user proxy identifier list sent by the second sending module 401;

The second determining unit is configured to determine whether a current user proxy identifier exists in the user proxy identifier list received by the first receiving module 302, if yes, it is legitimate, otherwise, it is not legitimate;

The third generating module 304 is specifically configured to, when the second determining unit determines that the current user proxy identifier exists in the user proxy identifier list received by the first receiving module 302, generate the first final challenge data according to the application identifier and the challenge value which are obtained by the second parsing module 303 by parsing the authentication request;

The first error reporting module is specifically configured to report an error when the second determining unit determines that the current user proxy identifier does not exist in the user proxy identifier list received by the first receiving module 302;

The third generating module 304 is specifically configured to generate the first final challenge data according to the application identifier and the challenge value which are obtained by the second parsing module 303 by parsing the authentication request when the second determining module determines that the current user proxy identifier is legitimate according to the application identifier obtained by the second parsing module 303 by parsing the authentication request;

The first error reporting module is configured to report an error when the second determining module determines that the current user proxy identifier is not legitimate according to the application identifier obtained by the second parsing module 303 by parsing the authentication request.

Optionally, the authenticator 60 further includes a first updating module; the first obtaining module 608 includes a searching unit and an obtaining unit;

The first updating module is configured to update the token accessing data generated by the sixth generating module 604 according to the application identifier obtained by the third parsing module 603 by parsing the identity information verifying instruction;

The second presetting module 609 is further configured to preset an original signature key data;

The searching unit is configured to search for target original signature key data from original signature key data preset by the second presetting module 609 according to the signature key identifier list and the application identifier which are obtained by the third parsing module 603 by parsing the identity information verifying instruction, the token accessing data updated by the first updating module;

Optionally, the searching unit includes a searching sub-unit, a decrypting sub-unit, a screening sub-unit and a marking sub-unit;

The second preset module 609 is further configured to preset the wrapper key;

The searching sub-unit is configured to search for original signature key encrypted data according to the signature key identifier list and the application identifier which are obtained by the third parsing module 603 parses the identity information verifying instruction;

The decrypting sub-unit is configured to decrypt, according to the wrapper key preset by the second presetting module 609, the original signature key encrypted data obtained by the searching sub-unit to obtain the original signature key data list;

The screening sub-unit is configured to screen the original signature key data list obtained by the decrypting sub-unit according to the token accessing data updated by the first updating module;

The determining sub-unit is configured to determine the number of the original signature key data remained in the original signature key data list which is screened by the screening sub-unit;

The marking sub-unit is configured to record the remained original signature key data as the target original signature key data when the determining sub-unit determines that the number of the original signature key data remained in the original signature key data list screened by the screening sub-unit is 1.

The obtaining unit is configured to obtain a signature private key and the signature key identifier which correspond to the target original signature key data according to the target original signature key data searched by the searching unit;

Optionally, the authenticator 60 further includes a second updating module; the server 50 further includes a fifth verifying module and a third updating module;

The second preset module 609 is further configured to preset a first counting value;

The second updating module is configured to update a first counting value preset by the second presetting module 609;

The tenth generating module 612 is specifically configured to generate an authentication response according to the identifier of the authenticator 60 preset by the second preset module 609, the final challenge hash value generated by the seventh generating module 605, the signature key identifier obtained by the first obtaining module 608, the signature value generated by the ninth generating module 611 and the first counting value updated by the second updating module;

The fourth parsing module 506 is further configured to parse the authentication response received by the third receiving module 502 to obtain a first counting value;

The fifth verifying module is configured to, before the first determining module determines that all results of the verifying of the second authenticating module 507, the third authenticating module 508 and the fourth authenticating module 509 are successful, verify the first counting value obtained by the fourth parsing module 506 by parsing the authentication response;

The first determining module 510 is further configured to determine whether the verifying made by the fifth verifying module is successful;

The third updating module is configured to update a preset second counting value according to the first counting value obtained by the fourth parsing module 506 by parsing the authentication response when the first determining module 510 determines that the verifying made by the fifth verifying module is successful.

Optionally, the server 50 further includes a third presetting module;

The third presetting module is configured to preset the second counting value;

The fifth verifying module is specifically configured to determine whether the first counting value obtained by the fourth parsing module 506 by parsing the authentication response is greater than the second counting value preset by the third presetting module, if yes, the verifying is successful; otherwise, the verifying is failed.

Optionally, the server 50 further includes a sixth verifying module;

The tenth generating module 612 is specifically configured to generate the authentication response according to the identifier of the authenticator 60 preset by the second presetting module 609, the first final challenge data generated by the third generating module, the final challenge hash value generated by the seventh generating module 605, the signature key identifier obtained by the first obtaining module 608 and the signature value generated by the ninth generating module 611;

The sixth authenticating module is configured to verify the first final challenge data obtained by the fourth parsing module by parsing the authentication response;

The first determining module 510 is further configured to determine whether the verifying made by the sixth verifying module is successful.

Optionally, the server 50 further includes a sixth verifying module; the client further includes a fourth updating module;

The fourth updating module is configured to attach the first final challenge data generated by the third generating module 304 to the authentication response received by the first receiving module 302 to update the authentication response;

The first sending module 301 is further configured to send the authentication response updated by the fourth updating module to the relying party 40;

The sixth verifying module is configured to verify the first final challenge data obtained by the fourth parsing module 506 by parsing a registering response;

The first determining module 510 is further configured to determine whether the verifying made by the sixth authenticating module is successful.

Optionally, the sixth authenticating module is specifically configured to determine whether the application identifier in the first final challenge data obtained by the fourth parsing module 506 by parsing the authentication response is identical to the application identifier obtained by the first parsing module 503 by parsing the authentication triggering request; determines whether the first final challenge data obtained by the fourth parsing module 506 by parsing the authentication response is identical to the challenge value generated by the first generating module 504, when the application identifier in the first final challenge data obtained by the fourth parsing module 506 by parsing the authentication response is identical to the application identifier obtained by the first parsing module 503 by parsing the authentication triggering request and the first final challenge data obtained by the fourth parsing module 506 by parsing the authentication response by is identical to the challenge value generated by the first generating module 504, the verifying is successful; otherwise, the verifying is failed.

In addition, when a user uses bio-identity information for registering, the user completes identity authenticating by providing bio-identity information or PIN code to an authenticator, which avoids trouble caused by forgetting password or code, eliminates or reduces dependence of a password or code and improves user experience.

In addition, in the present embodiment, the data transmission between the client and the relying party can be performed via secure channel, the data transmission via the secure channel is encrypted data; even if the data is intercepted, the data is encrypted data, therefore the original data will not be leaked, which insures security of the transferred data; in the present embodiment, the client determines the legitimacy of the current user proxy identifier according to the application identifier, ensures the legitimacy of the user proxy and makes the registering process and the authenticating process to be safer.

Figure 6:
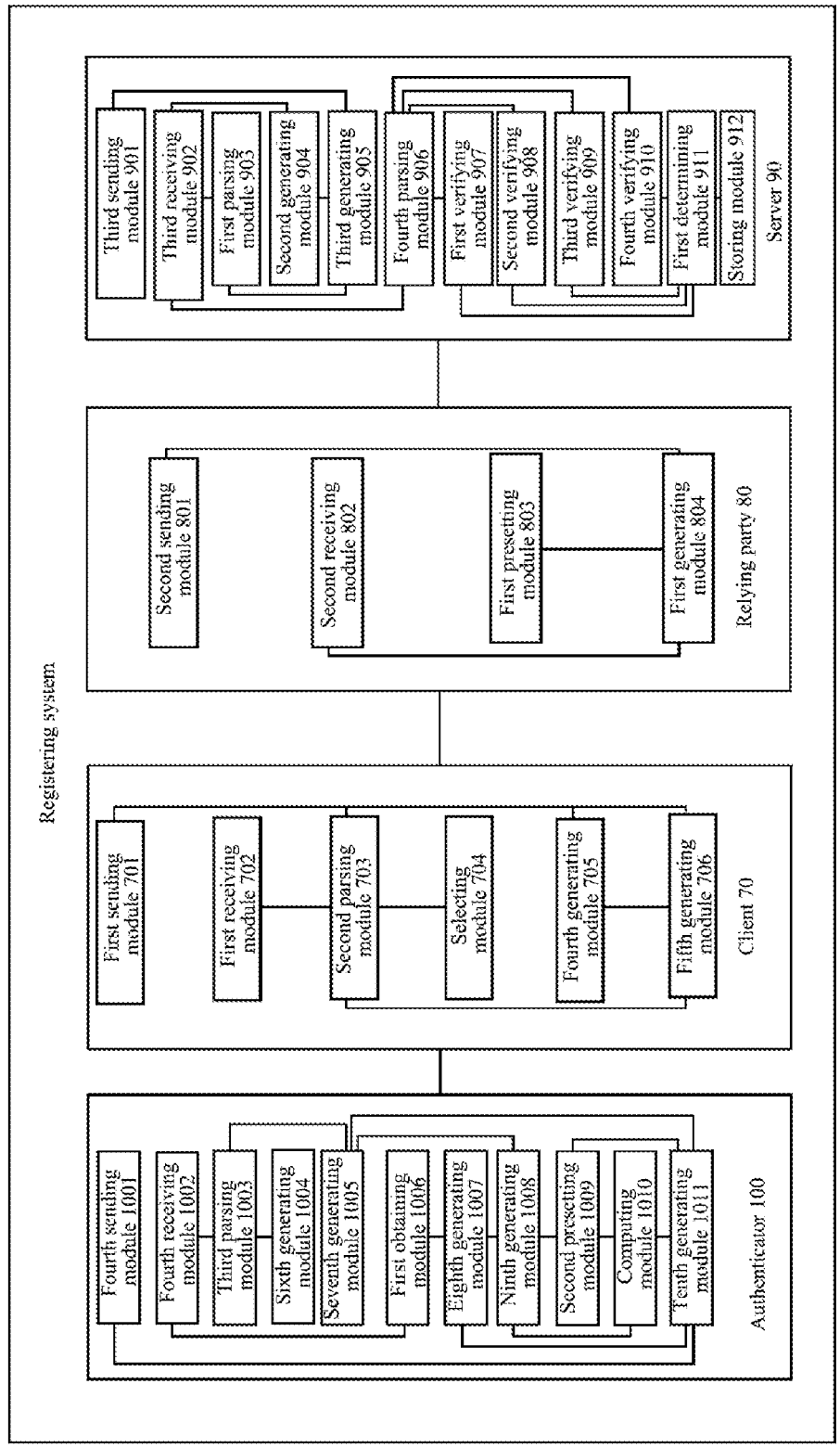
FIG. 6 is a block diagram of a registering system provided by Embodiment 3 of the present disclosure.

Optionally, Embodiment 3 of the present disclosure further includes a registering system, the registering system can be a system which is the same as the above authenticating system, i.e. a registering process is completed in the system, and then an authenticating process is completed in the system. Or the registering system is a system which a different system from the above authenticating system, which is illustrated as an example in the present embodiment. FIG. 6 is a block diagram of a registering system provided by Embodiment 3 of the present disclosure. As shown by FIG. 6, the registering system includes an authenticator 100, a client 70, a relying party 80 and a server 90;

The client 70 includes a first sending module 701, a first receiving module 702, a second parsing module 703, a selecting module 704, a fourth generating module 705 and a fifth generating module 706;

The relying party 80 includes a second sending module 801, a second receiving module 802, a first presetting module 803 and a first generating module 804;

The server 90 includes a third sending module 901, a third receiving module 902, a first parsing module 903, a second generating module 904, a third generating module 905, a fourth parsing module 906, a first verifying module 907, a second verifying module 908, a third verifying module 909, a fourth verifying module 901, a first determining module 911 and a storing module 912;

The authenticating module 100 includes a fourth sending module 1001, a fourth receiving module 1002, a third parsing module 1003, a sixth generating module 1004, a seventh generating module 1005, a first obtaining module 1006, an eighth generating module 1007, a ninth generating module 1008, a second presetting module 1009, a computing module 1010 and a tenth generating module 1011;

The first sending module 701 is configured to send a login registering request information including a user account to the relying party 80;

The second receiving module 802 is configured to receive the login registering request information including a user account sent by the first sending module 701;

The first presetting module 803 is configured to preset an application identifier;

The first generating module 804 is configured to, when the second receiving module 802 receives the login registering request information including the user account, generate a registration triggering request according to the user account and the application identifier preset by the first presetting module 803;

The second sending module 801 is configured to send the registration triggering request generated by the first generating module 804 to the server 90;

The third receiving module 902 is configured to receive the registration triggering request sent by the second sending module 801;

The first parsing module 903 is configured to parse the registration triggering request received by the third receiving module 902 to obtain the user account and the application identifier;

The second generating module 904 is configured to generate an authentication policy and a challenge value according to the registration triggering request received by the third receiving module 902;

The third generating module 905 is configured to generate a registering request according to the application identifier obtained by the first parsing module 903 by parsing the registration triggering request and the authentication policy and the challenge value which are generated by the second generating module 904;

The third sending module 901 is configured to send the registering request generated by the third generating module 905 to the relying party 80;

The second receiving module 802 is configured to receive the registering request sent by the third sending module 901;

The second sending module 801 is configured to send the registering request received by the second receiving module 802 to the client 70;

The first receiving module 702 is configured to receive the registering request sent by the second sending module 801;

The second parsing module 703 is configured to parse the registering request received by the first receiving module 702 to obtain the application identifier, the authentication policy, the challenge value and the user account;

The selecting module 704 is configured to select the authenticator 100 according to the authentication policy obtained by the second parsing module 703 by parsing the registering request;

Optionally, in the present embodiment, the selecting module 704 is specifically configured to select the authenticator 100 with a version identifier, an authenticator identifier and a user authenticating manner which are regulated by authentication policy obtained by the second parsing module 703 by parsing the registering request.

The fourth generating module 705 is configured to generate a first final challenge data according to the application identifier and the challenge value which are obtained by the second parsing module 703 by parsing the registering request;

The fifth generating module 706 is configured to generate an identity verifying instruction according to the first final challenge data generated by the fourth generating module, the application identifier and the user account which are obtained by the second parsing module 703 by parsing the registering request;

The first sending module 701 is further configured to send the identity verifying instruction generated by the fifth generating module 706 to the authenticator 100;

The fourth receiving module 1002 is configured to receive the identity verifying instruction sent by the first sending module 701;

The third parsing module 1003 is configured to parse the identity verifying instruction received by the fourth receiving module 1002 to obtain the first final challenge data, the application identifier and the user account;

The sixth generating module 1004 is configured to generate the token accessing data according to the application identifier and the user account which are obtained by the third parsing module 1003 by parsing the identity verifying instruction;

Optionally, in the present embodiment, the sixth generating module 1004 is specifically configured to generate combined data according to the application identifier and the user account which are obtained by the third parsing module 1003 by parsing the identity verifying instruction and performs hash operation on the combined data to generate the token accessing data.

The seventh generating module 1005 is configured to perform hash operation on the first final challenge data obtained by the third parsing module 1003 by parsing the identity verifying instruction to generate a final challenge hash value;

The first obtaining module 1006 is configured to obtain identity information of the user after the fourth receiving module 1002 receives the identity verifying instruction;

Optionally, in the present embodiment, the identity information of the user obtained by the first obtaining module 1006 includes the fingerprint information and/or palm information and/or voice information and/or face information and/or iris information and/or vain information and/or PIN code.

The eighth generating module 1007 is configured to generate a signature public key, a signature private key and a signature key identifier according to the identity information of the user obtained by the first obtaining module 1006;

The second presetting module 1009 is configured to preset an authenticator identifier, an authenticator private key and an authenticator certificate;

The ninth generating module 1008 is configured to generate data to be signed according to the authenticator identifier preset by the second presetting module 1009, the final challenge hash value generated by the seventh generating module 1005, the signature key identifier and the signature public key which are generated by the eighth generating module 1007;

The computing module 1010 is configured to obtain the signature value by performing calculation on the data to be signed generated by the ninth generating module 1008 using the authenticator private key preset by the second presetting module 1009;

The tenth generating module 1011 is configured to generate a registering response according to the authenticator identifier preset by the second presetting module 1009, the final challenge hash value generated by the seven generating module 1005, the signature public key generated by the eighth generating module 1007, the signature key identifier generated by the eighth generating module 1007, an authenticator certificate preset by the second presetting module 1009 and the signature value obtained by the computing made by the computing module 1010;

A fourth sending module 1001 is configured to send the registering response generated by the tenth generating module 1011 to the client 70;

The first receiving module 702 is further configured to receive the registering response sent by the fourth sending module 1001;

The first sending module 701 is further configured to send the registering response received by the first receiving module 702 to the relying party 80;

The second receiving module 802 is further configured to receive the registering response sent by the first sending module 701;

The second sending module 801 is further configured to send the registering response received by the second receiving module 802 to the server 90;

The third receiving module 902 is further configured to receive the registering response sent by the second sending module 801;

The fourth parsing module 906 is configured to parse the registering response received by the third receiving module 902 to obtain the authenticator identifier, the final challenge hash value, the authenticator certificate and the signature value;

The first verifying module 907 is configured to verify the authenticator identifier obtained by the fourth parsing module 906 by parsing the registering response;

Optionally, in the present embodiment, the first authenticating module 907 is specifically configured to determine whether the authenticator identifier obtained by the fourth parsing module 906 by parsing the registering response meets the authentication policy generated by the second generating module 904, when the authenticator identifier obtained by the fourth parsing module 906 by parsing the registering response meets the authentication policy generated by the second generating module 904; the verifying is successful.

The second authenticating module 908 is configured to verify the final challenge hash value obtained by the fourth parsing module 906 by parsing the registering response;

Optionally, in the present embodiment, the second verifying module 908 is specifically configured to generate a second final challenge data according to the application identifier obtained by the first parsing module 903 by parsing the registering request and the challenge value generated by the second generating module 904, perform hash operation on the generated second final challenge data to obtain a hash operation result, determine whether the generated hash operation result is identical to the final challenge hash value obtained by the fourth parsing module 906 by parsing the registering response, when the generated hash operation result is identical to the final challenge hash value obtained by the fourth parsing module 906 by parsing the registering response, the verifying is successful.

The third authenticating module 909 is configured to verify the authenticator certificate obtained by the fourth parsing module 906 by parsing the registering response;

Optionally, in the present embodiment, the third verifying module 909 is specifically configured to perform operation on the authenticator certificate obtained by the fourth parsing module 906 by parsing the registering response with a third preset algorithm to generate an operation result, determine whether the operation result is the first preset value, when the operation result is the first preset value, the verifying is successful.

The fourth verifying module 910 is configured to verify a signature value obtained by the fourth parsing module by parsing the registering response;

Optionally, in the present embodiment, the fourth verifying module 910 is specifically configured to extract authenticator public key from the authenticator certificate obtained by the fourth parsing module 906 by parsing the registering response, verify the signature value obtained by the fourth parsing module 906 by parsing the registering response with the second preset algorithm and the authenticator public key.

The first determining module 911 is configured to determine whether all results of the verifying of the first authenticating module 907, the second authenticating module 908, the third authenticating module 909 and the fourth authenticating module 910 are successful;

The storing module 912 is configured to, when all results of the verifying of the first authenticating module 907, the second authenticating module 908, the third authenticating module 909 and the fourth authenticating module 910 are successful, correspondingly store the signature public key, the signature key identifier and the authenticator identifier which are obtained by the fourth parsing module 906 by parsing the registering response.

Optionally, in the present embodiment, all data transmission between the relying party 80 and the client 70 is performed via a preset secure channel.

Further, in the present embodiment, the client 70 further includes a third presetting module;

The third presetting module is configured to preset security channel data;

The fourth generating module 705 is specifically configured to generate the first final challenge data according to the security channel data preset by the third presetting module, the application identifier and the challenge value obtained by the second parsing module 703 by parsing the registering request;

The second sending module 801 is further configured to send the security channel data preset by the third presetting module to the server 90;

The third receiving module 902 is further configured to receive the security channel data sent by the second sending module 801;

The second verifying module 908 further includes a first generating unit, a second generating unit and a first determining unit;

The first generating unit is configured to generate a second final challenge data according to the security channel data received by the third receiving module 902, the application identifier obtained by the first parsing module 903 by parsing the registration triggering request and the challenge value generated by the second generating module 904;

The second generating unit is configured to perform hash operation on the second final challenge data generated by the first generating unit to generate a hash operation result;

The first determining unit is configured to determine whether the hash operation result generated by the second generating unit is identical to the final challenge hash value obtained by the fourth parsing module 906 by parsing the registering response, if yes, the verifying is successful, otherwise, the verifying is failed.

Optionally, in the present embodiment, the client 70 further includes a second determining module and a first reporting module;

The second determining module is configured to determine whether a current user proxy identifier is legitimate according to the application identifier obtained by the second parsing module 703 by parsing the registering request;

Further, in the present embodiment, the second determining module specifically includes a third generating unit, a second determining unit; the relying party 80 further includes a second obtaining module;

The third generating unit is configured to generate a user proxy identifier list obtaining request according to the application identifier obtained by the second parsing module 703 by parsing the registering request;

The first sending module 701 is further configured to send the user proxy identifier list obtaining request generated by the third generating unit to the relying party 80;

The second receiving module 802 is further configured to receive the user proxy identifier list obtaining request sent by the first sending module 701;

The second obtaining module is configured to, after the second receiving module 802 receives the user proxy identifier obtaining request, obtain the user proxy identifier list;

The second sending module 801 is further configured to send the user proxy identifier list obtained by the second obtaining module to the client 70;

The first receiving module 702 is further configured to receive the user proxy identifier list sent by the second sending module 801;

The second determining unit is configured to determine whether the current user proxy identifier exists in the user proxy identifier list received by the first receiving module 702;

The fourth generating module 705 is specifically configured to, when the second determining unit determines that the current user proxy identifier exists in the user proxy identifier list received by the first receiving module 702, generate the first final challenge data according to the application identifier and the challenge value which are obtained by the second parsing module 703 by parsing the registering request;

The first error reporting module is specifically configured to report an error when the second determining module determines that the current user proxy identifier does not exist in the user proxy identifier list received by the first receiving module 702;

The fourth generating module 705 is specifically configured to, when the second determining module determines that the current user proxy identifier is legitimate according to the application identifier obtained by the second parsing module 703 by parsing the registering request, generate the first final challenge data according to the application identifier and the challenge value which are obtained by the second parsing module 703 by parsing the registering request;

The first error reporting module is configured to report an error when the second determining module determines that the current user proxy identifier is not legitimate according to the application identifier obtained by the second parsing module 703 by parsing the registering request.

Optionally, in the present embodiment, the client 70 further includes a displaying module and a prompting module;

The displaying module is configured to, when the number of the authenticator 100 which is selected by the selecting module 704 according to the authentication policy obtained by the second parsing module 703 by parsing the registering request, display the authenticator 100 which meets the authentication policy and is selected by the selecting module 704;

The prompting module is configured to prompt the user to select the authenticator 100 from the authenticator 100 displayed by the displaying module;

The third receiving module 902 is further configured to receive information that the user selects authenticator 100;

The third sending module 901 is further configured to send the identity verifying instruction generated by the fifth generating module 706 to the authenticator 100 which is corresponding to the information that the user selects the authenticator 100 and which is received by the third receiving module 902.

Optionally, in the present embodiment, the authenticator 100 further includes an eleventh generating module;

The eleventh generating module is configured to generate a random number;

The sixth generating module 1004 is specifically configured to generate the token accessing data according to the random number generated by the eleventh generating module, the application identifier and a user account which are obtained by the third parsing module by parsing the identity verifying instruction.

Optionally, in the present embodiment, the authenticator 100 further includes a second error reporting module;

The first obtaining module 1006 includes a first prompting unit and a third determining unit;

The first prompting unit is configured to prompt the user to input the identity information of the user;

The fourth receiving module 1002 is further configured to receive the identity information of the user input by the user when the first prompting unit prompts the user to input the identity information of the user;

The third determining unit is configured to determine whether the identity information of the user, which is input by the user, received by the fourth receiving module 1002 is verified successfully;

The seventh generating module 1005 is specifically configured to, when the third determining unit determines that the identity information of the user, which is input by the user, received by the fourth receiving module 1002 is verified successfully, generate a signature public key, a signature private key and a signature key identifier according to the identity information of the user received by the fourth receiving module 1002;

The second error reporting module is configured to report an error when the third determining unit determines that the identity information of the user, which is input by the user, is not verified successfully.

Optionally, in the present embodiment, the authenticator 100 further includes a third error reporting module;

The first obtaining module 1006 includes a second prompting unit and a fourth determining unit;

The second prompting unit is configured to prompt the user to input the identity information of the user;

The fourth determining unit is configured to determine whether the fourth receiving module 1002 receives the identity information of the user input by the user;

The seventh generating module 1005 is specifically configured to, when the fourth determining unit determines that the fourth receiving module 1002 receives the identity information of the user input by the user, generate a signature public key, a signature private key and a signature key identifier according to the identity information of the user received by the fourth receiving module 1002;

The third error reporting module is configured to report an error when the fourth determining module determines that the fourth receiving module 1002 does not receive the identity information of the user input by the user;

Optionally, in the present embodiment, the authenticator 100 further includes a first updating module; the server 90 further includes a fifth verifying module;

The second presetting module 1009 is further configured to preset a first counting value;

The first updating module is configured to update the first counting value preset by the second presetting module 1009;

The ninth generating module 1008 is specifically configured to generate data to be signed according to the preset authenticator identifier preset by the second presetting module 1009, the final challenge hash value generated by the seventh generating module 1005, the signature key identifier generated by the eighth generating module 1007, the signature public key generated by the eighth generating module 1007 and the first counting value updated by the first updating module;

The tenth generating module 1011 is specifically configured to generate a registering response according to the first counting value updated by the first updating module, the authenticator identifier preset by the second presetting module 1009, the final challenge hash value generated by the seventh generating module 1005, the signature public key generated by the eighth generating module 1007, a signature key identifier generated by the eighth generating module 1007, the authenticator certificate preset by the second presetting module 1009 and the signature value obtained by computing made by the computing module 1010;

The fourth parsing module 906 is further configured to parse the registering response received by the third receiving module 902 to obtain the first counting value;

The fifth verifying module is configured to, before the first determining module 911 determines that all results of the verifying made by the first authenticating module 907, the second authenticating module 908, the third authenticating module 909 and the fourth authenticating module 910 are successful, verify the first counting value obtained by the fourth parsing module 906 by parsing the registering response;

The first determining module 911 is further configured to determine whether the verifying of the fourth authenticating module is successful, otherwise, report an error, the procedure ends;

the storing module 912 is further configured to, when the first determining module 911 determines the verifying of the fifth authenticating module is successful, store the first counting value obtained by the fourth parsing module 906 by parsing the registering response received by the third receiving module 902;

Further, in the present embodiment, the storing module 912 is further configured to preset a second counting value;

The fifth verifying module is specifically configured to determine whether the first counting value obtained by the fourth parsing module 906 by parsing the registering response is greater than the second counting value preset by the storing module 912, if yes, the verifying is successful, otherwise, the verifying is failed.

Optionally, in the present embodiment, the server 90 further includes a sixth verifying module;

The tenth generating module 1011 is specifically configured to generate a registering response according to the authenticator identifier preset by the second presetting module 1009, the first final challenge data generated by the fourth generating module 705, the final challenge hash value generated by the seventh generating module 1005, the signature public key generated by the eighth generating module 1007, the signature key identifier generated by the eighth generating module 1007, the authenticator certificate preset by the second presetting module 1009 and the signature value obtained by computing made by the computing module 1010;

The sixth verifying module is configured to verify the first final challenge data obtained by the fourth parsing module 906 by parsing the registering response;

The first determining module 911 is further configured to determine whether the verifying of the sixth verifying module is successful;

Optionally, in the present embodiment, the client 70 further includes a second updating module and a sixth verifying module;

The second updating module is configured to attach the first final challenge data generated by the fourth generating module 705 to the registering response generated by the tenth generating module 1011 to update the registering response;

The sixth verifying module is configured to verify the first final challenge data obtained by the fourth parsing module 906 by parsing the registering response;

The first determining module 911 is further configured to determine whether the verifying of the sixth authenticating module is successful;

Further, in the present embodiment, the sixth verifying module is specifically configured to determine whether the application identifier in the first final challenge data obtained by the fourth parsing module 906 by parsing the registering response is identical to the application identifier obtained by the first parsing module 903 by parsing the registration triggering request; determine whether the challenge value in the first final challenge data obtained by the fourth parsing module 906 by parsing the registering response is identical to the challenge value generated by the second generating module 904, if all of the determining results are yes, the verifying is successful, otherwise, the verifying is failed.

Optionally, in the present embodiment, the server 90 further includes a third determining module and a fourth error reporting module;

The third determining module is configured to determine whether the authenticator 100 is registered according to the authenticator identifier and the signature key identifier which are obtained by the fourth parsing module 906 by parsing the registering response;

The fourth error reporting module is configured to report an error when the authenticator 100 is determined to be a registered authenticator according to the authenticator identifier and the signature key identifier which are obtained by the fourth parsing module 906 by parsing the registering response;

The storing module 912 is specifically configured to, when the authenticator 100 is determined to be an unregistered authenticator according to the authenticator identifier and the signature key identifier which are obtained by the fourth parsing module 906 by parsing the registering response, store the signature public key, the signature key identifier and the authenticator identifier correspondingly.

Comparing with the prior art, the present disclosure has the following advantages: the authenticator stores the private information such as user signature private key, while the server cannot get the user private information; therefore the risk that the user private information may be stolen or replaced is eliminated, security of authenticating is improved; in this way, leaking of private information of a lot of users which is caused by an attacked server is avoided.

The principles and embodiments of the application are described herein by specific examples, and the descriptions of the embodiments above are only used to help understand the method and core idea of the application. In addition, those skilled in the art can made variations to both specific embodiments and application scope according to the idea of the application. In summary, the content of the specification should not be interpreted as limiting the application.

What claimed is:

1. A working method of an authenticating system, comprising the following steps:

Step S1, parsing, by a server, an authentication triggering request to obtain an application identifier when the server receives the authentication triggering request comprising a preset application identifier sent from a relying party; generating an authentication policy and a challenge value according to the authentication triggering request; generating an authentication request according to the authentication policy and the challenge value and sending the authentication request to a client via the relying party;

Step S2, receiving and parsing, by the client, the authentication request to obtain the application identifier, the authentication policy and the challenge value; generating a first final challenge data according to the application identifier and the challenge value which are obtained by the parsing; selecting an authenticator according to the authentication policy; generating a signature key identifier list according to the authentication policy; generating an identity information verifying instruction according to the first final challenge data, the application identifier and the signature key identifier list and sending the identity information verifying instruction to the selected authenticator;

Step S3, receiving and parsing, by the authenticator, the identity information verifying instruction to obtain the first final challenge data, the application identifier and the signature key identifier list, generating token accessing data according to the application identifier; performing calculation on the first final challenge data to generate a final challenge hash value; prompting a user to input identity information of the user, verifying the identity information of the user input by the user, when the verifying is successful, executing Step S4; otherwise, reporting an error, the procedure ends;

Step S4, obtaining, by the authenticator, a signature private key and a signature key identifier according to the signature key identifier list, the application identifier and the token accessing data; generating data to be signed according to a preset authenticator identifier, the final challenge hash value and the signature key identifier; generating a signature value by performing calculation on the data to be signed using the signature private key; generating an authentication response according to the authenticator identifier, the final challenge hash value, the signature key identifier and the signature value, and sending the authentication response to the server via the client and the relying party;

Step S5, receiving and parsing, by the server, the authentication response to obtain the authenticator identifier, the final challenge hash value, the signature key identifier and the signature value; verifying the authenticator identifier and the final challenge hash value respectively, verifying the signature value according to the signature key identifier, determining whether all results of the verifying are successful, if yes, the verification is successful, otherwise, the verification is failed.

2. The method of claim 1, wherein before Step S1, the method further comprises:

Step S6, generating, by the relying party, a registration triggering request according to a user account and a preset application identifier when the relying party receives a login registering request information comprising the user account sent from the client and sending the registration triggering request to the server;

Step S7, receiving and parsing, by the server, the registration triggering request to obtain the user account and the application identifier; generating an authentication policy and a challenge value according to the registration triggering request; generating a registering request according to the application identifier, the authentication policy, the challenge value and the user account and sending the registering request to the client via the relying party;

Step S8, receiving and parsing, by the client, the registering request to obtain the application identifier, the authentication policy, the challenge value and the user account; selecting an authenticator according to the authentication policy; generating a first final challenge data according to the application identifier and the challenge value; generating an identity verifying instruction according to the first final challenge data, the application identifier and the user account and sending the identity verifying instruction to the selected authenticator;

Step S9, receiving and parsing, by the authenticator, the identity verifying instruction to obtain the first final challenge data, the application identifier and the user account; generating token accessing data according to the application identifier and the user account; performing hash operation on the first final challenge data to generate a final challenge hash value; obtaining identity information of the user; generating a signature public key, a signature private key and a signature key identifier according to the identity information of the user;

Step S10, generating by the authenticator, data to be signed according to the preset authenticator identifier, the final challenge hash value, the signature key identifier and the signature public key, obtaining a signature value by performing calculation on the data to be signed using a preset authenticator private key; generating a registering response according to the authenticator identifier, the final challenge hash value, the signature public key, the signature key identifier, a preset authenticator certificate and the signature value and sending the registering response to the server via the client and the relying party;

Step S11, receiving and parsing, by the server, the registering response, respectively verifying the authenticator identifier, the final challenge hash value, the authenticator certificate and the signature value which are obtained by parsing the registering response; determining whether all results of the verifying are successful, if yes, correspondingly storing the signature public key, the signature key identifier and the authenticator identifier which are obtained by parsing the registering response, otherwise, reporting an error, ends.

3. The method of claim 1, wherein all data transmission between the relying party and the client is performed via a preset secure channel.

4. The method of claim 3, wherein in Step S2, the generating a first final challenge data according to the application identifier and the challenge value which are obtained by the parsing specifically comprises: generating, by the client, a first final challenge data according to preset security channel data, the application identifier and the challenge value;

in Step S5, before the verifying the final challenge hash value, the method further comprises: receiving, by the server, the preset security channel data sent by the relying party;

in Step S5, the verifying the final challenge hash value specifically comprises:

generating, by the server, a second final challenge data according to the preset security channel data, the application identifier obtained by parsing the authentication triggering request and the generated challenge value, performing hash operation on the second final challenge data to generate a hash operation result, determining whether the generated hash operation result is identical to the final challenge hash value obtained by parsing the authentication response, if yes, the verifying for the final challenge hash value is successful; otherwise, the verifying for the final challenge hash value is failed.

5. The method of claim 1, wherein in Step S2, after the receiving and parsing, by the client, the authentication request to obtain the application identifier, the authentication policy and the challenge value, the method further comprises: determining, by the client, whether a current user proxy identifier is legitimate according to the application identifier obtained by the parsing, if yes, generating the first final challenge data according to the application identifier and the challenge value which are obtained by the parsing, otherwise, reporting an error;

in Step S2, the determining, by the client, whether the current user proxy identifier is legitimate according to the application identifier obtained by parsing comprises the following steps:

Step D1, generating, by the client, a request for a user proxy identifier list according to the application identifier; sending the request for a user proxy identifier list to the relying party;

Step D2, receiving, by the relying party, the request for a user proxy identifier list, obtaining a user proxy identifier list and sending the obtained user proxy identifier list to the client;

Step D3, receiving, by the client, the user proxy identifier list, determining whether the current user proxy identifier exists in the user proxy identifier list, if yes, the current user proxy identifier is legitimate, otherwise, the current user proxy identifier is not legitimate.

6. The method of claim 1, wherein after the generating the token accessing data according to the application identifier, before the obtaining, by the authenticator, the signature private key and the signature key identifier according to the signature key identifier list, the application identifier and the token accessing data, the method further comprises: updating, by the authenticator, the token accessing data according to the application identifier;

in Step S4, the obtaining, by the authenticator, the signature private key and the signature key identifier according to the signature key identifier list, the application identifier and the token accessing data specifically comprises:

searching, by the authenticator, target original signature key data from preset original signature key data according to the signature key identifier list, the application identifier and the updated token accessing data; obtaining the signature private key and the signature key identifier which are corresponding to the target original signature key data;

wherein the searching, by the authenticator, the target original signature key data from the preset original signature key data according to the signature key identifier list, the application identifier and the updated token accessing data comprises the following steps:

Step A1, searching, by the authenticator, original signature key encrypted data according to the signature key identifier list and the application identifier;

Step A2, decrypting, by the authenticator, the original signature key encrypted data according to a preset wrapper key to obtain an original signature key data list; and Step A3, screening, by the authenticator, the original signature key data list according to the updated token accessing data, determining the number of original signature key data remained in the original signature key data list after the screening, recording the original signature key data remained in the original signature key data list as the target original signature key data when the number of the original signature key data remained in the original signature key data list after the screening is 1.

7. The method of claim 1, wherein in Step S4, the sending the authentication response to the server via the client and the relying party comprises the following steps:

Step C1, sending, by the authenticator, the authentication response to the client;

Step C2, receiving, by the client, the authentication response, attaching the generated first final challenge data to the authentication response to update the authentication response, and sending the authentication response to the relying party; and Step C3, receiving, by the relying party, the authentication response, and sending the authentication response to the server;

in Step S5, after the receiving and parsing, by the server, the authentication response, before the determining whether all results of the verifying are successful, the method further comprises:

determining, by the server, whether the application identifier in the first final challenge data obtained by parsing the authentication response is identical to the application identifier obtained by parsing the authentication triggering request, determining whether the challenge value in the first final challenge data is identical to the generated challenge value, when the application identifier in the first final challenge data obtained by parsing the authentication response is identical to the application identifier obtained by parsing the authentication triggering request and the challenge value in the first final challenge data is identical to the generated challenge value, the verifying is successful, otherwise, the verifying is failed.

8. The method of claim 2, wherein in Step S8, the generating the first final challenge data according to the application identifier and the challenge value specifically comprises: generating, by the client, the first final challenge data according to preset security channel data, the application identifier and the challenge value;

in Step S11, before the verifying the final challenge hash value obtained by parsing the registering response, the method further comprises: receiving, by the server, the preset security channel data sent by the relying party;

in Step S11, the verifying the final challenge hash value which is obtained by parsing the registering response specifically comprises:

performing hash operation on the second final challenge data to generate a hash operation result according to the received preset security channel data, the application identifier and the generated second final challenge data, determining whether the generated hash operation result is identical to the final challenge hash value obtained by parsing the registering response, if yes, the verifying is successful, otherwise, the verifying is failed.

9. The method of claim 2, wherein in Step S8, after the receiving parsing, by the client, the registering request to obtain the application identifier, the authentication policy, the challenge value and the user account, the method further comprises: determining, by the client, whether a current user proxy identifier is legitimate according to the application identifier, if yes, generating a first final challenge data according to the application identifier and the challenge value, otherwise, reporting an error;

wherein the determining, by the client, whether the current user proxy identifier is legitimate according to the application identifier, if yes, generating the first final challenge data according to the application identifier and the challenge value; otherwise, reporting an error, specifically comprises the following steps:

Step D4, generating, by the client, a user proxy identifier list obtaining request according to the application identifier and sending the user proxy identifier list obtaining request to the relying party;

Step D5, receiving, by the relying party, the user proxy identifier list obtaining request, obtaining the user proxy identifier list and sending the user proxy identifier list to the client; and Step D6, receiving, by the client, the user proxy identifier list, determining whether the current user proxy identifier exists in the user proxy identifier list, if yes, determining the current user proxy identifier is legitimate and generating the first final challenge data according to the application identifier and the challenge value, otherwise, reporting an error.

10. The method of claim 2, wherein in Step S10, the sending the registering response to the server via the client and the relying party specifically comprises the following steps:

Step C4, sending, by the authenticator, the registering response to the client;

Step C5, receiving, by the client, the registering response, attaching the generated first final challenge data to the registering response to update the registering response and sending the updated registering response to the relying party; and Step C6, receiving, by the relying party, the updated registering response and sending the updated registering response to the server;

in Step S11, after the receiving and parsing, by the server, the registering response, before the determining whether all results of the verifying are successful, the method further comprises: verifying, by the server, the first final challenge data obtained by parsing the registering response;

wherein the verifying, by the server, the first final challenge data obtained by parsing the registering response specifically comprises: determining, by the server, whether the application identifier in the first final challenge data obtained by parsing the registering response is identical to the application identifier in the registration triggering request; determining whether the challenge value in the first final challenge data obtained by parsing the registering response is identical to the generated challenge value, if both results of the determining are yes, the verifying is successful, and determining whether all results of the verifying is successful, otherwise, the verifying is failed.

11. The method of claim 2, wherein in Step S11, before the correspondingly storing the signature public key, the signature key identifier and the authenticator identifier which are obtained by parsing the registering response, the method further comprises: determining, by the server, whether the authenticator is registered according to the authenticator identifier and the signature key identifier which are obtained by parsing the registering response, if yes, reporting an error, otherwise, correspondingly storing the signature public key, the signature key identifier and the authenticator identifier.

12. An authenticating system, comprising an authenticator, a client, a relying party and a server;

the server is configured to parse the authentication triggering request to obtain an application identifier when an authentication triggering request comprising a preset application identifier sent by the relying party is received; generate an authentication policy and a challenge value according to the authentication triggering request; generate an authentication request according to the application identifier, the authentication policy and the challenge value, send the authentication request to the client via the relying party;

the client is configured to receive and parse the authentication request to obtain the application identifier, the authentication policy and the challenge value; generate a first final challenge data according to the application identifier and the challenge value which are obtained by the parsing; select the authenticator according to the authentication policy; generate a signature key identifier list according to the authentication policy; generate an identity information verifying instruction according to the first final challenge data, the application identifier and the signature key identifier list and sending the identity information verifying instruction to the authenticator;

the authenticator is configured to receive and parse the identity information verifying instruction to obtain the first final challenge data, the application identifier and the signature key identifier list; generate token accessing data according to the application identifier; perform calculation on the first final challenge data to generate a final challenge hash value; prompt a user to input identity information of the user, verify the identity information of the user input by the user; report an error when authenticating is failed, the procedure ends;

the authenticator is further configured to obtain a signature private key and a signature key identifier according to the signature key identifier list, the application identifier and the token accessing data; generate data to be signed according to a preset authenticator identifier, the final challenge hash value and the signature key identifier; generate a signature value by performing calculation on the data to be signed using the signature private key; generate an authentication response according to the authenticator identifier, the final challenge hash value, the signature key identifier and the signature value and send the authentication response to the server via the client and the relying party;

the server is further configured to receive and parse the authentication response to obtain the authenticator identifier, the final challenge hash value, the signature key identifier and a signature value, verify the authenticator identifier and the final challenge hash value respectively, verify the signature value according to the signature key identifier, determine whether all results of the verifying are successful, if yes, the verification is successful, otherwise, the verification is failed.

13. The system of claim 12, wherein the relying party is further configured to generate a registration triggering request according to a user account and a preset application identifier when receiving a login registering request information comprising the user account sent from the client, and send the registration triggering request to the server;

the server is further configured to receive and parse the registration triggering request to obtain the user account and the application identifier; generate an authentication policy and a challenge value according to the registration triggering request; generate a registering request according to the application identifier, the authentication policy, the challenge value and the user account and send the registering request to the client via the relying party;

the client is further configured to receive and parse the registering request to obtain the application identifier, the authentication policy, the challenge value and the user account; select an authenticator according to the authentication policy; generate a first final challenge data according to the application identifier and the challenge value; generate an identity verifying instruction according to the first final challenge data, the application identifier and the user account and sending the identity verifying instruction to the selected authenticator;

the authenticator is further configured to receive and parse the identity verifying instruction to obtain the first final challenge data, the application identifier and the user account; generate token accessing data according to the application identifier and the user account; perform hash operation on the first final challenge data to generate a final challenge hash value; obtain identity information of the user; generate a signature public key, a signature private key and a signature key identifier according to the identity information of the user;

the authenticator is further configured to generate data to be signed according to the preset authenticator identifier, the final challenge hash value, the signature key identifier and the signature public key, obtain a signature value by performing calculation on the data to be signed using a preset authenticator private key; generate a registering response according to the authenticator identifier, the final challenge hash value, the signature public key, the signature key identifier, a preset authenticator certificate and the signature value and send the registering response to the server via the client and the relying party;

the server is further configured to receive and parse the registering response, respectively verify the authenticator identifier, the final challenge hash value, the authenticator certificate and the signature value which are obtained by parsing the registering response; determine whether all the verifying are success, if yes, correspondingly store the signature public key, the signature key identifier and the authenticator identifier which are obtained by parsing the registering response, otherwise, report an error, the procedure ends.

14. The system of claim 12, wherein all data transmission between the relying party and the client is performed via a preset secure channel.

15. The system of claim 14, wherein the client further is configured to generate a first final challenge data according to the preset security channel data, the application identifier and the challenge value;

the server is further configured to receive the preset security channel data sent by the relying party before the verifying the final challenge hash value;

the server is further configured to generate a second final challenge data according to the preset security channel data, the application identifier obtained by parsing the authentication triggering request and the generated challenge value, performing hash operation on the second final challenge data to generate a hash operation result, determining whether the generated hash operation result is identical to the final challenge hash value obtained by parsing the authentication response, if yes, the verifying for the final challenge hash value is successful; otherwise, the verifying for the final challenge hash value is failed.

16. The system of claim 12, wherein the client is further configured to, after the receiving and parsing, by the client, the authentication request to obtain the application identifier, the authentication policy and the challenge value, determine whether a current user proxy identifier is legitimate according to the application identifier obtained by the parsing, if yes, generate the first final challenge data according to the application identifier and the challenge value which are obtained by the parsing, otherwise, report an error;

the client is further configured to generate a request for a user proxy identifier list according to the application identifier; send the request for a user proxy identifier list to the relying party;

the relying party is further configured to receive the request for a user proxy identifier list, obtain a user proxy identifier list and send the user proxy identifier list to the client;

the client is further configured to receive the user proxy identifier list, determine whether the current user proxy identifier exists in the user proxy identifier list, if yes, the current user proxy identifier is legitimate, otherwise, the current user proxy identifier is not legitimate.

17. The system of claim 12, wherein the authenticator is further configured to, after the generating token accessing data according to the application identifier and before the obtaining the signature private key and the signature key identifier according to the signature key identifier list, the application identifier and the token accessing data, update the token accessing data according to the application identifier;

the authenticator is further configured to search target original signature key data from preset original signature key data according to the signature key identifier list, the application identifier and the updated token accessing data; obtain the signature private key and the signature key identifier which are corresponding to the target original signature key data;

the authenticator is further configured to search original signature key encrypted data according to the signature key identifier list and the application identifier;

the authenticator is further configured to decrypt the original signature key encrypted data according to a preset wrapper key to obtain an original signature key data list;

the authenticator is further configured to screen the original signature key data list according to the updated token accessing data, determine the number of original signature key data remained in the original signature key data list after the screening, record the original signature key data remained in the original signature key data list as the target original signature key data when the number of original signature key data remained in the original signature key data list after screening is 1.

18. The system of claim 12, wherein the authenticator is further configured to send the authentication response to the client;

the client is further configured to receive the authentication response, attach the generated first final challenge data to the authentication response to update the authentication response and send the authentication response to the relying party;

the relying party is further configured to receive the authentication response and send the authentication response to the server;

the server is further configured to, after the receiving and parsing the authentication response and before the determining whether all results of the verifying are successful, determine whether the application identifier in the first final challenge data obtained by parsing the authentication response is identical to the application identifier obtained by parsing the authentication triggering request, determine whether the challenge value in the first final challenge data is identical to the generated challenge value, when the application identifier in the first final challenge data obtained by parsing the authentication response is identical to the application identifier obtained by parsing the authentication triggering request and the challenge value in the first final challenge data is identical to the generated challenge value, the verifying is successful, otherwise, the verifying is failed.

19. The system of claim 13, wherein the client is further configured to generate a first final challenge data according to preset security channel data, the application identifier and the challenge value;

the server is further configured to, before the verifying the final challenge hash value obtained by parsing the registering response, receive the preset security channel data sent by the relying party;

the server is further configured to performing hash operation on the second final challenge data to generate a hash operation result according to the received preset security channel data, the application identifier and the generated second final challenge data, determining whether the generated hash operation result is identical to the final challenge hash value obtained by parsing the registering response, if yes, the verifying is successful, otherwise, the verifying is failed.

20. The system of claim 12, wherein the client further is configured to, after the receiving and parsing the registering request to obtain the application identifier, the authentication policy, the challenge value and the user account, determine whether a current user proxy identifier is legitimate according to the application identifier, if yes, generate a first final challenge data according to the application identifier and the challenge value, otherwise, report an error;

the client further is configured to generate a user proxy identifier list obtaining request according to the application identifier and send the user proxy identifier list obtaining request to the relying party;

the relying party is further configured to receive the user proxy identifier list obtaining request, obtain the user proxy identifier list and send the user proxy identifier list to the client;

the client is further configured to receive the user proxy identifier list, determine whether the current user proxy identifier exists in the user proxy identifier list, if yes, determine the current user proxy identifier is legitimate and generate the first final challenge data according to the application identifier and the challenge value; otherwise, report an error.

21. The system of claim 13, wherein
the authenticator is further configured to send the registering response to the client;
the client is further configured to receive the registering response, attach the generated first final challenge data to the registering response to update the registering response and send the updated registering response to the relying party;
the relying party is further configured to receive the updated registering response and send the updated registering response to the server;
the server is further configured to, after the receiving and parsing the registering response and before the determining whether all results of the verifying are successful, verify the first final challenge data obtained by parsing the registering response;
the server is further configured to determine whether the application identifier in the first final challenge data obtained by parsing the registering response is identical to the application identifier in the registration triggering request; determine whether the challenge value in the first final challenge data obtained by parsing the registering response is identical to the generated challenge value, if both results of the determining are yes, the verifying is successful, and determine whether all the verifying is successful, otherwise, the verifying is failed.

22. The system of claim 13, wherein the server is further configured to, before the correspondingly storing the signature public key, the signature key identifier and the authenticator identifier, determine whether the authenticator is registered according to the authenticator identifier and the signature key identifier which are obtained by parsing the registering response, if yes, report an error, otherwise, correspondingly store the signature public key, the signature key identifier and the authenticator identifier.

* * * * *